US006287703B1

(12) United States Patent
Inokuti

(10) Patent No.: US 6,287,703 B1
(45) Date of Patent: Sep. 11, 2001

(54) ULTRALOW-IRON-LOSS GRAIN ORIENTED SILICON STEEL PLATE AND PROCESS FOR PRODUCING THE SAME

(75) Inventor: Yukio Inokuti, Chiba (JP)

(73) Assignee: Kawasaki Steel Corporation (JP)

(*) Notice: Subject to any disclaimer, the term of this patent is extended or adjusted under 35 U.S.C. 154(b) by 0 days.

(21) Appl. No.: 09/367,671

(22) PCT Filed: Dec. 22, 1998

(86) PCT No.: PCT/JP98/05817

§ 371 Date: Aug. 18, 1999

§ 102(e) Date: Aug. 18, 1999

(87) PCT Pub. No.: WO99/34377

PCT Pub. Date: Jul. 8, 1999

(30) Foreign Application Priority Data

Dec. 24, 1997 (JP) .......... 9-354490
Feb. 25, 1998 (JP) .......... 10-43238
Mar. 23, 1998 (JP) .......... 10-74274
Mar. 23, 1998 (JP) .......... 10-74275

(51) Int. Cl.[7] .......... B32B 3/30; B32B 18/04

(52) U.S. Cl. .......... 428/472; 428/332; 428/216; 428/141; 428/697; 428/698; 428/699; 148/307; 148/308

(58) Field of Search .......... 148/308, 307; 428/472, 332, 216, 141, 697, 698, 699

(56) References Cited

U.S. PATENT DOCUMENTS 4,698,272 * 10/1987 Inokuti et al. .
5,174,833 * 12/1992 Tanaka et al. .
5,296,051 * 3/1994 Inokuti et al. .

FOREIGN PATENT DOCUMENTS 5-279 747 * 10/1993 (JP) .

* cited by examiner

*Primary Examiner*—Deborah Jones
*Assistant Examiner*—Jason Savage
(74) *Attorney, Agent, or Firm*—Schnader Harrison Segal & Lewis LLP

(57) ABSTRACT

This invention can considerably improve the adhesion property of a film to a matrix surface of a silicon steel sheet by forming an interface layer such as nitride-oxide layer of one or more selected from Fe, Si, Al and B or an extremely thin base film formed by finely dispersing nitride-oxide of one or more selected from Fe, Si, Al and B in the same film components as a tension insulating film at an interface between the matrix surface and the tension insulating film, or further by immersing in an aqueous solution of a chloride mainly composed of $SiCl_4$ to dissolve the matrix surface or conducting a smoothening treatment or a pickling treatment with an aqueous solution containing $SiCl_4$ prior to the formation of the interface layer, and hence ultra-low core loss grain oriented silicon steel sheets having a core loss considerably superior to that of the conventional one and an excellent magnetostriction property can be obtained very cheaply and in a higher productivity.

9 Claims, 6 Drawing Sheets

ULTRALOW-IRON-LOSS GRAIN ORIENTED SILICON STEEL PLATE AND PROCESS FOR PRODUCING THE SAME

TECHNICAL FIELD

This invention relates to a ultra-low core loss grain oriented silicon steel sheet and a method of producing the same, and more particularly its object it is to realize more improvement of core loss property together with an improvement of compression stress in magnetostriction.

As will be detailed hereinafter, Applicants do this at low cost by forming an extremely thin Si-containing nitride-oxide layer on a surface of final annealed silicon steel sheet or a surface of final annealed silicon steel sheet having a linear concave region and forming a tension insulating film thereon.

BACKGROUND ART

The grain oriented silicon steel sheet is mainly used as a core of a transformer or other electrical apparatus and is required to have a high magnetic flux density (represented by $B_8$ value) and a low core loss (represented by $W_{17/50}$) as a magnetic property.

In order to improve the magnetic properties of the grain oriented silicon steel sheet, it is required to highly align the <001> axis of secondary recrystallized grain in the steel sheet into the rolling direction on one hand, and it is required to decrease impurities and precipitates remaining in the final product as far as possible on the other hand.

For this end, after a basic production technique of the grain oriented silicon steel sheet through two-stage cold rolling has been proposed by N. P. Goss, many improvements for such a production technique have been repeated to improve the magnetic flux density and core loss value of the grain oriented silicon steel sheet every year.

Among them, there are typically a method described in JP-B-51-13469 using Sb and MnSe or MnS as an inhibitor and a method described in JP-B-33-4710, JP-B-40-15644, JP-B-46-23820 and the like using AlN and MnS as an inhibitor. According to these methods, there was obtained a product having a high magnetic flux density that $B_8$ exceeds 1.88T.

In order to obtain a product having a higher magnetic flux density, JP-B-57-14737 discloses the composite addition of Mo to a starting material or JP-B-62-42968 discloses the application of quenching treatment after the intermediate annealing just before final cold rolling after the composite addition of Mo to the starting material, whereby there are obtained a high magnetic flux density where $B_8$ is not less than 1.90T and a low core loss that core loss $W_{17/50}$ is not more than 1.05 W/kg (product thickness: 0.30 mm). However, there is left room to be further improved as to sufficient reduction of core loss.

Particularly, it is considerably demanded to reduce power loss as far as possible because of the energy crisis, and it is desired to more improve the loss even in the application as an iron core material accompanied therewith. For this end, many products thinning the product thickness to not more than 0.23 mm (9 mil) are used for decreasing eddy current loss as much as possible.

The aforementioned techniques are mainly metallurgical methods. Besides these methods, there is developed a method of reducing core loss (technique of finely dividing magnetic domain), in which the surface of the steel sheet after the final annealing is subjected to laser irradiation or plasma irradiation to artificially decrease the 180° magnetic domain width (B. Fukuda, K. Sato, T. Sugiyama, A. Honda and Y. Ito: Proc. of ASM Con. of Hard and Soft Magnetic Materials, 8710-008, (USA), (1987)). The core loss of the grain oriented silicon steel sheet is largely reduced by the development of such a technique.

However, this technique has a drawback that it is not durable to annealing at a higher temperature, so that there is a problem that the application is restricted to only a laminated core type transformer not requiring strain relief annealing.

In this connection, a method wherein linear grooves are introduced in a surface of a steel sheet after the final annealing of the grain oriented silicon steel sheet to finely divide magnetic domain through anti-magnetic field effect of such grooves is industrialized as a finely magnetic domain dividing technique durable to strain relief annealing (H. Kobayashi, E. Sasaki, M. Iwasaki and N. Takahashi: Proc. SMM-8., (1987), P.402).

Besides this technique, a method wherein the magnetic domain is divided by subjecting a final cold rolled sheet of the grain oriented silicon steel sheet to a local electrolytic etching to form grooves (JP-B-8-6140) is also developed and industrialized.

Apart from the aforementioned production methods of the silicon steel sheet, amorphous alloys are noticed as a material for the usual power transformer, high-frequency transformer or the like as disclosed in JP-B-55-19976, JP-A-56-127749 and JP-A-2-3213.

However, a very excellent core loss property is obtained in such amorphous materials as compared with the conventional grain oriented silicon steel sheet, but they have demerits in practical use because thermal stability is lacking, space factor is poor, cutting is not easy, and they are too thin and brittle, to bringing about a large cost up in the assembled step of the transformer, and hence it is not yet attained to use a greater amount of such materials at the present time.

In addition, JP-B-52-24499 proposes a method wherein a forsterite base film formed after the final annealing of the silicon steel sheet is removed and the surface of the steel sheet is polished and then the surface of the steel sheet is subjected to a metal plating.

In this method, however, a low core loss is obtained at a low temperature, but when it is subjected to a high temperature treatment, the metal diffuses into the silicon steel sheet and there is a drawback that the core loss property is rather degraded.

In order to solve the above problem, the inventors have disclosed in JP-B-63-54767 and the like that an ultra-low core loss is obtained by forming one or more tension films selected from the group consisting of nitrides and carbides of Si, Mn, Cr, Ni, Mo, W, V, Ti, Nb, Ta, Hf, Al, Cu, Zr and B on the grain oriented silicon steel sheet smoothened by polishing through CVD or a dry plating (PVD) such as ion plating, ion implantation or the like.

Although a very excellent core loss property as a material for a power transformer, high-frequency transformer or the like is obtained by such a production method, it can not be said to sufficiently respond to the recent demand for the attainment of low core loss.

Therefore, the inventors have made fundamental reexaminations from all viewpoints for more reducing the core loss as compared with the conventional one.

That is, in order to obtain product having a ultra-low core loss by forming one or more tension films selected from various nitrides and carbides on the smoothened surface of the grain oriented silicon steel sheet at a stabilized step, the inventors became aware that it is required to conduct fundamental reexamination from raw material components of the grain oriented silicon steel sheet to the final treating step, and have made various studies from a pursuit on texture of a silicon steel sheet to smoothness of steel sheet surface or a final CVD or PVD treating step.

As a result, we have found the following:

(1) A thin ceramic film covered on the silicon steel sheet (use TiN film as a typical example) lessens the degree of improving the core loss even when it is formed at a thickness of not less than 1.5 μm. That is, TiN film having a thickness of not less than 1.5 μm can expect a slight improvement to the core loss and rather brings about the degradation of space factor and magnetic flux density.

(2) In this case, TiN is more important to play a role of adhesion to the silicon steel sheet in addition to the application of tension inherent to the ceramic. That is, when a lateral section of TiN is observed by means of a transmission electron microscope (see Yukio Inokuti: Bulletin of The Japan Institute of Metals, 60(1996), P.781~786), a lateral stripe of 10 nm is observed, which corresponds to a 5 atom layer of Fe—Fe atom in [011] direction of the silicon steel sheet.

(3) When a two-layer texture of a TiN covered zone and chemical polished zone is simultaneously measured by X-ray (see Y Inokuti: ISIJ International, 36(1996), P.347~352), the {200} peak form of Fe in the polished zone is an circle. However, the {200} peak form of Fe in the TiN covered zone is an ellipsoid and is at a state of strongly applying tension in the $[100]_{si\text{-}steel}$ direction of the silicon steel sheet.

(4) Tension of TiN film is 8~10 MPa (see Yukio Inokuti, Kazuhiro Suzuki, Yasuhiro Kobayashi: Bulletin of The Japan Institute of Metals, 60(1996), P.674~678), from which an improvement of magnetic flux density of about 0.014~0.016T can be expected. (This corresponds to the improvement of degree of Goss orientation alignment of about 1°).

Although the above is novel knowledge regarding the ceramic coating, we have further obtained the following knowledge relating to surface state of ceramic film and steel sheet.

(5) When the final cold rolled sheet of the silicon steel sheet is subjected to local electrolytic etching to form grooves and the surface of the steel sheet after the secondary recrystallization treatment is smoothened by polishing a TiN ceramic film is coated thereon, the core loss is effectively reduced by fine division of magnetic domain through the anti-magnetic field that resulted from the formed grooves and further by the application of tension through the ceramic film.

(6) The effect of reducing the core loss by tension when a concave groove is formed on the surface of the steel sheet prior to the ceramic coating is larger than that of the silicon steel sheet smoothened by the usual polishing (see JP-B-3-32889).

That is, when the groove is formed, a difference between tension through the coating on the groove forming portion and tension through the coating on the portion not forming the groove or a different tension is applied to the surface of the silicon steel sheet to increase the degree of reduction of the core loss by such a tension.

(7) When the ceramic film is coated on the silicon steel sheet having the concave grooves therein, the effect of reducing the core loss is more effective than the case of smoothening by polishing and coating the ceramic film.

That is, the linear grooves are formed to finely divide the magnetic domain through the anti-magnetic effect of these grooves and then the ceramic tension film is formed to further finely divide 180° main magnetic domain, whereby ultra-low core loss is more effectively obtained.

(8) When the grooves are formed by subjecting the final cold rolled sheet of the silicon steel sheet to local electrolytic etching, even if a TiN ceramic film is formed at a surface state that the surface of the steel sheet after the secondary recrystallization treatment is not smoothened by polishing, a considerable effect of reducing the core loss is developed. That is, when the ceramic film having a small thermal expansion coefficient is coated even at a state of being not smoothened by polishing, e.g. with small irregularities on the surface through pickling treatment or the like, it is possible to apply a strong tension to the surface of the silicon steel sheet, whereby the core loss can advantageously be reduced.

We have made many experiments and examinations based on the above knowledge in order to achieve a given object and found out that it is very effective to reduce the core loss when plural kinds of ceramic tension films are formed on the surface of the silicon steel sheet in either case of the surface-smoothened silicon steel sheet and the linear groove-formed silicon steel sheet, and the thermal expansion coefficients of these ceramic tension films are decreased toward the outside, and grain oriented silicon steel sheets having a very low core loss are newly developed (specification of Japanese Patent Application No. 9-328042).

The thus obtained grain oriented silicon steel sheets are provided with a very thin ceramic tension film having an excellent adhesion property and are possible to attain an ultra-low core loss and have an insulating property and are excellent in the space factor, so that they are certainly said to be ideal silicon steel sheets.

However, treatment in a high plasma atmosphere under vacuum is indispensable for forming such a dense ceramic film. In this case, the ceramic film can not be formed at a high speed and productivity is low, so that there is a problem that the cost is up.

Besides this, Japanese Patent No. 2662482 and No. 2664326 recently proposed low core loss grain oriented silicon steel sheets having improved adhesion to film and core loss by forming a composite film of oxidized Al-oxidized B on the smoothened surface of the steel sheet.

However, the core loss value $W_{17/50}$ of the silicon steel sheet formed by these methods is only about 0.77~0.83 W/kg in a product having a thickness of 0.2 mm, so that it should be said that there is left room to be improved because the core loss value is merely related to the extent the product thickness is thinned.

DISCLOSURE OF THE INVENTION

The inventors have made again investigations with respect to the surface state of the silicon steel sheet and further the tension insulating film formed on the surface thereof based on the above knowledge.

And also, we have examined the improvement of compression stress property of magnetostriction (hereinafter referred to as magnetostriction property simply).

The magnetostriction of the silicon steel sheet is a phenomenon of elastically vibrating the steel sheet when the steel sheet is magnetized, which is a greatest cause of noise in the transformer.

The magnetostriction behavior results from the fact that the magnetization course of the steel sheet includes 90° domain wall movement and rotation magnetization, so that the magnetostriction increases in accordance with the compression stress applied to the steel sheet. In the assembling of the transformer, compression stress is inevitably applied to the steel sheet, so that the feature that tension is previously applied to the steel sheet is advantageous in view of compression stress of magnetostriction. Of course, the application of tension to the steel sheet effectively contributes to improve the core loss in the grain oriented silicon steel sheet.

Heretofore, it is attempted to improve the magnetostriction property in the grain oriented silicon steel sheet by adding tension with sub-scale ($SiO_2$) formed on the surface of the steel sheet in decarburization and primary recrystallization annealing prior to the secondary recrystallization, a forsterite base film formed by a high temperature reaction in the final annealing with an annealing separator mainly composed of MgO and a tension insulating film formed thereon and consisting essentially of phosphate and colloidal silica, but it can not be expected to sufficiently improve the magnetostriction property to a satisfactory extent by such a conventional method.

As a result of the above investigations, it has been found that if an interface layer including one or more nitride-oxide selected from Fe, Si, Al and B is formed on the surface of the silicon steel sheet, when usual tension insulating film of a phosphate is subsequently formed as a tension film, not only the core loss can considerably be reduced but also the magnetostriction property can effectively be improved and further the improvement of production efficiency and reduction of the cost are attained.

That is, it has been discovered that it is effective to form an extremely thin Si-containing nitride-oxide layer on the surface of the steel sheet by adhering one or more elements selected from Fe, Si, Al and B, particularly Si in an active state, and subsequently exposing to a non-oxidizing atmosphere containing N or subjecting it to a heat treatment in a non-oxidizing atmosphere.

And also, it has been found that when a treating solution obtained by diluting a coating solution for the tension insulating film with water prior to the formation of the tension insulating film consisting essentially of phosphate and colloidal silica and adding an inorganic compound including one or more elements selected from Fe, Si, Al and B to the diluted solution is applied thinly to adhere the inorganic compound containing a slight amount of Fe or the like onto the surface of the steel sheet and thereafter preferably subjected to a heat treatment in a non-oxidizing atmosphere, an extremely thin film having fundamentally the same film components as the tension insulating film is formed and also the inorganic compound existing in the film and including Fe or the like changes into a nitride-oxide of Fe or the like having a high activity to strongly adhere to the surface of the steel sheet and hence the extremely thin film is formed on the surface of the steel sheet with a high adhesion. On the other hand, it has been found that since the extremely thin film is the same as the tension insulating film formed thereon, the adhesion property of these films is very good and hence the tension insulating film having a considerably excellent adhesion property as compared with the conventional one can be formed on the surface of the steel sheet and as a result grain oriented silicon steel sheets having a very low core loss and an excellent magnetostriction property can be produced with high productivity and a low cost.

Further, it has been found that before the application of the treating solution obtained by adding a slight amount of an inorganic compounds including one or more selected from Fe, Si, Al and B to a diluted solution of the coating solution consisting essentially of phosphate and colloidal silica with water, when the grain oriented silicon steel sheet is immersed in an aqueous solution of $SiCl_4$ or a chloride consisting essentially of $SiCl_4$ to dissolve the surface of the matrix, or when a smoothening treatment or pickling treatment is carried out by using an aqueous solution containing $SiCl_4$, the adhesion property of the base film to the steel sheet is more improved.

The invention will concretely be described below.

Firstly, experimental results resulting in the invention are explained.

EXPERIMENT 1

A continuously cast slab of silicon steel having a composition of C: 0.068 wt %, Si: 3.33 wt %, Mn: 0.067 wt %, Se: 0.020 wt %, Sb: 0.025 wt %, Al: 0.020 wt %, N: 0.0076 wt % and Mo: 0.013 wt % and the remainder being substantially Fe is heated at 1350° C. for 4 hours and hot rolled to obtain a hot rolled sheet of thickness: 2.0 mm. The hot rolled sheet is subjected to normalization annealing at 970° C. for 3 minutes and rolled twice through an intermediate annealing at 1050° C. to obtain a final cold rolled sheet of thickness: 0.23 mm.

Thereafter, the final cold rolled sheet is treated as follows.

① An etching resist ink consisting essentially of an alkyd resin is applied onto the surface of the final cold rolled sheet by gravure offset printing so as to leave linear non-coated portions of width: 200 μm at an interval: 4 mm in a direction substantially perpendicular to a rolling direction, and baked at 200° C. for 3 minutes. In this case, a resist thickness is 2 μm. The steel sheet coated with the etching resist is subjected to an electrolytic etching to form linear grooves of width: 200 μm and depth: 20 μm and then immersed in an organic solvent to remove the resist. In this case, the electrolytic etching is carried out in NaCl electrolyte under conditions of current density: 10 $A/dm^2$ and treating time: 20 seconds.

② For the comparison, there is provided the final cold rolled sheet not subjected to the treatment of the item ①.

Thereafter, the steel sheets of the items ① and ② are subjected to decarburization and primary recrystallization annealing in wet $H_2$ of 840° C., and a slurry of an annealing separator having a composition of MgO(20%), $Al_2O_3$(75%) and $CaSiO_3$(5%) is applied to the surface of the steel sheet and annealed at 850° C. for 15 hours and temperature is raised from 850° C. to 1150° C. at a rate of 10° C./h to develop secondary recrystallized grains strongly aligned in Goss orientation and subjected to purification annealing in dry $H_2$ of 1200° C.

The surface film of the thus obtained product is removed and then the surface of the silicon steel sheet is smoothened by chemical polishing and thereafter subjected to one of three treatments mentioned below.

(A) After an extremely thin Si film of about 0.02 μm in thickness is formed on the surface of the silicon steel sheet by magnetron sputtering process (one of PVD processes), it is treated in a mixed gas of $N_2$(50%)+$H_2$ (50%) at 1000° C. for 10 minutes. Thereafter, a tension insulating film (thickness of about 2 μm) consisting essentially of colloidal silica and phosphate is formed on the surface of the steel sheet and baked at 800° C.

(B) The surface of the silicon steel sheet is treated in a mixed gas of $SiCl_4$+$N_2$+$H_2$ at 950° C. for 10 minutes (CVD process). Thereafter, a tension insulating film (thickness of about 2 μm) consisting essentially of colloidal silica and phosphate is formed on the surface of the steel sheet and baked at 800° C.

(C) The silicon steel sheet is immersed in an aqueous solution of $SiCl_4$ (0.5 mol/1) at 80° C. for 10 seconds and treated in a mixed gas of $N_2$(50%)+$H_2$(50%) at 900° C. for 10 minutes. Thereafter, a tension insulating film (thickness of about 2 μm) consisting essentially of colloidal silica and phosphate is formed on the surface of the steel sheet and baked at 800° C.

The magnetic properties and adhesion property of the thus obtained products and further analytical values of Si, O and N elements on the surface of the silicon steel sheet prior to the formation of the insulating film as measured by X-ray photoelectron microscope spectroscopic apparatus (X-ray Photoelectron Spectroscopy, XPS process) are shown in Table 1.

In Table 1 is also shown results when the surface of the grain oriented silicon steel sheet is smoothened by chemical polishing after the secondary recrystallization treatment is carried out by the methods ① and ② and the surface film is removed from the product and then a tension insulating film (thickness of about 2 μm) consisting essentially of colloidal silica and phosphate is formed on the surface of the steel sheet and baked at 800° C. as a comparative example.

Particularly, the method (C) is noticed.

That is, the method (C) has a merit capable of conducting the treatment very cheaply and efficiently because it is enough to treat in the mixed gas of $N_2$(50%)+$H_2$(50%) at 900° C. for 10 minutes after the immersion in the aqueous solution of $SiCl_4$ (0.5 mol/l) at 80° C. for 10 seconds.

As this type of the conventional technique, there is proposed a method of forming an external oxidation type oxide layer of $SiO_2$ film on the polished surface of the silicon steel sheet in JP-A-60-131976, JP-A-6-184762 and JP-A-9-78252.

However, the gist of these method is a method similar to the formation of sub-scale mainly composed of $SiO_2$ through the treatment in wet $H_2$ in the decarburization-primary recrystallization annealing for removing harmful C in the silicon steel sheet. Particularly, in the method of utilizing $SiO_2$ formed by such an oxidation treatment of the steel sheet, it has already been pointed out that the effect of reducing the core loss through the mirror formation of the silicon steel sheet is lessened.

And also, JP-A-5-279747 proposes a method of forming an insulating film wherein an aqueous solution of lithium silicate ($Li_2O.nSiO_2$), sodium silicate ($Na_2O.nSiO_2$) or the like (water glass) is applied and baked as a base film prior to the application of an insulating coating consisting essentially of colloidal silica and phosphate on the surface of the grain oriented electromagnetic steel sheet.

In this method, however, Si compound used as a material for the base film is an oxide form such as $SiO_2$, so that it is hardly said that the adhesion property to the surface of the steel sheet or the binder effect to the surface of the steel sheet is sufficient and hence there can not be obtained the good adhesion property to the film and hence the effect of reducing the core loss as in the invention.

TABLE 1

| Treating condition | Formation of extremely thin layer containing Si | Magnetic properties $B_8$ (T) | $W_{17/50}$ (W/kg) | Adhesion properties bending * | evaluation | XPS analysis (count/sec) Si | N | O |
|---|---|---|---|---|---|---|---|---|
| ① | A | 1.91 | 0.59 | 20 mm | ○ | 22000 | 1200 | 5100 |
| ② | | 1.94 | 0.72 | 20 mm | ○ | — | — | — |
| Comparative of ① | none | 1.91 | 0.80 | ** | X | 2000 | 280 | 800 |
| ① | B | 1.90 | 0.60 | 20 mm | ○ | — | — | — |
| ② | | 1.94 | 0.73 | 30 mm | ○ | 18000 | 1300 | 4200 |
| Comparative of ② | none | 1.93 | 0.93 | ** | X | 1800 | 320 | 700 |
| ① | C | 1.91 | 0.59 | 20 mm | ○ | 13000 | 780 | 2300 |
| ② | | 1.94 | 0.73 | 20 mm | ○ | 12000 | 800 | 2200 |
| Comparative of ② | none | 1.93 | 0.95 | ** | X | 2900 | 330 | 900 |

*Diameter (mm) causing no peeling of film by 180° bending on round rod.
**Measurement of adhesion property is impossible due to the peeling of film.

As seen from the results of Table 1, it is possible to produce ultra-low core loss grain oriented silicon steel sheets having excellent magnetic properties and adhesion property when the annealing treatment in the non-oxidizing atmosphere is carried out after the formation of the extremely thin Si on the silicon steel sheet to form the Si-containing nitride-oxide layer on the surface of the silicon steel sheet (the increase of Si, N, O is characteristic in the measurement of XPS, and a great amount of O is observed in spite of the treatment in the non-oxidizing atmosphere, and Si is easily bonded to oxygen) and the tension insulating film is formed thereon.

As mentioned above, when the PVD method (A) and the CVD method (B) are adopted as a method of forming Si film on the surface of the silicon steel sheet, they cause the cost-up in the industrial production, but the film thickness becomes extremely thin, so that the cost can be reduced by thinned portion as compared with the conventional method.

EXPERIMENT 2

A continuously cast slab of silicon steel having a composition of C: 0.076 wt %, Si: 3.42 wt %, Mn: 0.075 wt %, Se: 0.020 wt %, Sb: 0.023 wt %, Al: 0.020 wt %, N: 0.0075 wt % and Mo: 0.012 wt % and the remainder being substantially Fe is heated at 1350° C. for 4 hours and hot rolled to obtain a hot rolled sheet of thickness: 2.0 mm. The hot rolled sheet is subjected to normalization annealing at 1000° C. for 3 minutes and rolled twice through an intermediate annealing at 1020° C. to obtain a final cold rolled sheet of thickness: 0.23 mm.

Thereafter, the final cold rolled sheet is treated as follows.

① An etching resist ink consisting essentially of an alkyd resin is applied onto the surface of the final cold rolled sheet by gravure offset printing so as to leave linear non-coated portions of width: 200 $\mu$m at an interval: 4 mm in a direction substantially perpendicular to a rolling direction, and baked at 200° C. for 3 minutes. In this case, a resist thickness is 2 $\mu$m. The steel sheet coated with the etching resist is subjected to an electrolytic etching to form linear grooves of width: 200 $\mu$m and depth: 20 $\mu$m and then immersed in an organic solvent to remove the resist. In this case, the electrolytic etching is carried out in NaCl electrolyte under conditions of current density: 10 A/dm$^2$ and treating time: 20 seconds.

② For the comparison, there is provided the final cold rolled sheet not subjected to the treatment of the item ①.

Then, these steel sheets are subjected to decarburization and primary recrystallization annealing in wet $H_2$ of 840° C., and thereafter a slurry of an annealing separator having a composition of MgO(15%), $Al_2O_3$(75%) and $CaSiO_3$(10%) is applied to the surface of the steel sheet ①, while a slurry of an annealing separator mainly composed of MgO is applied to the surface of the steel sheet ②, and then these sheets are annealed at 850° C. for 15 hours and temperature is raised from 850° C. to 1150° C. at a rate of 10° C./h to develop secondary recrystallized grains strongly aligned in Goss orientation and subjected to purification annealing in dry $H_2$ of 1200° C.

Thereafter, the thus obtained steel sheets are subjected to the following treatment.

(a) The oxide film on the surface of the silicon steel sheet treated under the condition ① is treated with a mixed pickling solution of HCl(10%) and $H_3PO_4$(8%), immersed in an aqueous solution of $SiCl_4$ (0.02 mol/l) at 85° C. for 30 seconds and then a tension insulating film (thickness of about 1.5 $\mu$m) consisting essentially of magnesium phosphate and colloidal silica is formed (800° C.) on the surface of the steel sheet.

(b) After the oxide film on the surface of the silicon steel sheet treated under the condition ① is treated with HCl(10%), it is chemically polished with 3% hydrofluoric acid and hydrogen peroxide, immersed in an aqueous solution of $SiCl_4$ (0.02 mol/l) at 85° C. for 30 seconds and then a tension insulating film (thickness of about 1.5 $\mu$m) consisting essentially of magnesium phosphate and colloidal silica is formed (800° C.) on the surface of the steel sheet.

(c) On the surface of the silicon steel sheet provided with forsterite film treated under the condition ② is formed (800° C.) a tension insulating film (thickness of about 1.5 $\mu$m) consisting essentially of magnesium phosphate and colloidal silica.

The thus obtained silicon steel sheets are subjected to strain relief annealing at 800° C. for 2 hours to obtain product sheets.

As the magnetic properties of each product sheet are measured, the sheet (a) has $B_8$=1.91T and $W_{17/50}$=0.66 W/kg and the sheet (b) has $B_8$=1.91T and $W_{17/50}$=0.65 W/kg, which are very excellent as compared with the conventional sheet (c) having $B_8$=1.91T and $W_{17/50}$=0.73 W/kg.

And also, the compression stress property of magnetostriction in each product sheet is measured to obtain results as shown in FIG. 1.

As shown in this figure, the increase of magnetic strain $\lambda_{PP}$ is hardly observed in the invention examples (a) and (b) even when compression stress is increased to 0.7 kg/mm$^2$, while in the conventional sheet (c), the magnetic strain $\lambda_{PP}$ rapidly increases when compression stress is not less than 0.35 kg/mm$^2$, and the magnetic strain $\lambda_{PP}$ indicates a large value reaching to 3.2×10$^{-6}$ when compression stress is 0.50 kg/mm$^2$.

The reason why the compression stress property of magnetostriction is improved by forming an extremely thin Si-containing nitride-oxide layer prior to the formation of the tension insulating film according to the invention is considered as follows.

That is, in the existing silicon steel sheet having forsterite base film, as shown in FIG. 2(*a*), many anchors made of sulfide or nitride are existent just beneath the surface of the steel sheet (about 2~3 $\mu$m), so that the movement of magnetic domain is obstructed. When the forsterite base film of the silicon steel sheet is formed by solid phase reaction between MgO and the sub-scale ($SiO_2$) on the surface of the silicon steel sheet in the secondary recrystallization annealing in Goss orientation, the adhesion property to the matrix is ensured by the presence of many anchors as mentioned above. For this end, the magnetic strain $\lambda_{PP}$ of the silicon steel sheet increases as compression stress is applied.

On the contrary, in the silicon steel sheet strongly adhered with the insulating film through the strong binder effect of the extremely thin Si-containing nitride-oxide layer formed on the matrix surface according to the invention, the movement of magnetic domain is easy and also tension is directly applied to the steel sheet, so that the compression stress property of magnetostriction is effectively improved.

Moreover, it goes without saying that tensile stress applied to such a silicon steel sheet is effective to improve not only the magnetostriction but also the core loss, and particularly the effect thereof is conspicuous in case of the grain oriented silicon steel sheet having a high magnetic flux density highly aligned in Goss orientation.

EXPERIMENT 3

A continuously cast slab of silicon steel having a composition of C: 0.067 wt %, Si: 3.38 wt %, Mn: 0.077 wt %, Se: 0.020 wt %, Sb: 0.023 wt %, Al: 0.021 wt %, N: 0.0078 wt % and Mo: 0.012 wt % and the remainder being substantially Fe is heated at 1340° C. for 5 hours and hot rolled to obtain a hot rolled sheet of thickness: 2.0 mm. The hot rolled sheet is subjected to normalization annealing at 980° C. for 3 minutes and rolled twice through an intermediate annealing at 1030° C. to obtain a final cold rolled sheet of thickness: 0.23 mm.

Thereafter, the final cold rolled sheet is treated as follows.

① An etching resist ink consisting essentially of an alkyd resin is applied onto the surface of the final cold rolled sheet by gravure offset printing so as to leave linear non-coated portions of width: 200 $\mu$m at an interval: 4 mm in a direction substantially perpendicular to a rolling direction, and baked at 200° C. for 3 minutes. In this case, a resist thickness is 2 $\mu$m. The steel sheet coated with the etching resist is subjected to an electrolytic etching to form linear grooves of width: 200 $\mu$m and depth: 20 $\mu$m and then immersed in an organic solvent to remove the resist. In this case, the electrolytic etching is carried out in NaCl electrolyte under conditions of current density: 10 A/dm$^2$ and treating time: 20 seconds.

② For the comparison, there is provided the final cold rolled sheet not subjected to the treatment of the item ①.

Thereafter, the steel sheets of the items ① and ② are subjected to decarburization and primary recrystallization annealing in wet $H_2$ of 840° C., and a slurry of an annealing separator having a composition of MgO(15%), $Al_2O_3$(75%) and $CaSiO_3$(10%) is applied to the surface of the steel sheet and annealed at 850° C. for 15 hours and temperature is raised from 850° C. to 1150° C. at a rate of 12° C./h to develop secondary recrystallized grains strongly aligned in Goss orientation and subjected to purification annealing in dry $H_2$ of 1220° C.

The surface film of the thus obtained product is removed and then the surface of the silicon steel sheet is smoothened by chemical polishing and thereafter subjected to one of six treatments mentioned below.

(A) The silicon steel sheet is immersed in a treating solution of 80° C. obtained by diluting 250 cc of a coating solution for tension insulating film consisting essentially of phosphate and colloidal silica with 1500 cc of distilled water and further adding 25 cc of $SiCl_4$ solution to the diluted solution for 20 seconds, washed with water and dried.

(B) The silicon steel sheet is immersed in a treating solution of 80° C. obtained by diluting 250 cc of a coating solution for tension insulating film consisting essentially of phosphate and colloidal silica with 1500 cc of distilled water and further adding 25 cc of $SiCl_4$ solution and 25 g of $FeCl_3$ together to the diluted solution for 20 seconds, washed with water and dried.

(C) The silicon steel sheet is immersed in a treating solution of 80° C. obtained by diluting 250 cc of a coating solution for tension insulating film consisting essentially of phosphate and colloidal silica with 1500 cc of distilled water and further adding 25 cc of $SiCl_4$ solution and 25 g of $AlPO_4.3/2H_2O$ together to the diluted solution for 20 seconds, washed with water and dried.

(D) The silicon steel sheet is immersed in a treating solution of 80° C. obtained by diluting 250 cc of a coating solution for tension insulating film consisting essentially of phosphate and colloidal silica with 1500 cc of distilled water and further adding 20 g of $FeCl_3$, 20 g of $Al(NO_3)$ and 10 g of $H_3BO_3$ together to the diluted solution for 20 seconds, washed with water and dried.

(E) The silicon steel sheet is immersed in a treating solution of 80° C. obtained by diluting 250 cc of a coating solution for tension insulating film consisting essentially of phosphate and colloidal silica with 1500 cc of distilled water for 20 seconds, washed with water and dried.

(F) The silicon steel sheet is immersed in a treating solution of 80° C. obtained by diluting 250 cc of a coating solution for tension insulating film consisting essentially of phosphate and colloidal silica with 1500 cc of distilled water and further adding 25 cc of $SiCl_4$ solution to the diluted solution for 20 seconds, washed with water and dried.

(G) After the final annealing, the oxide on the surface of the silicon steel sheet is removed by pickling.

Then, the silicon steel sheets treated in the items (A)~(E) are subjected to a heat treatment in a mixed gas of $N_2$(50%)+$H_2$(50%) at 950° C. for 10 minutes.

Thereafter, a tension insulating film (thickness of about 2 μm) consisting essentially of magnesium phosphate and colloidal silica is formed (800° C.) on the surface of the steel sheet.

The magnetic properties and adhesion property of the thus obtained products are measured to obtain results as shown in Table 2.

TABLE 2

| Condition | Treating method (solution consisting essentially of phosphate and colloidal silica) | Magnetic properties $B_8$ (T) | $W_{17/50}$ (W/kg) | Adhesion property* (mm) | Remarks |
|---|---|---|---|---|---|
| ①-A | $SiCl_4$: 50 cc | 1.90 | 0.58 | 20 | Invention Example |
| ①-B | $SiCl_4$: 25 cc and $FeCl_2$: 25 g | 1.91 | 0.57 | 25 | Invention Example |
| ①-C | $SiCl_4$: 25 cc and $AlPO_4$: 25 g | 1.90 | 0.59 | 20 | Invention Example |
| ①-D | $FeCl_3$: 20 g, $Al(NO_3)_3$: 20 g and $H_3BO_3$: 10 g | 1.91 | 0.59 | 20 | Invention Example |
| ①-E | no addition of inorganic compound including Si, Fe, Al, B | 1.90 | 0.72 | X (peeling) | Comparative Example |
| ①-F | $SiCl_4$: 50 cc no annealing of ($H_2$ + $N_2$) at 950° C. | 1.90 | 0.60 | 25 | Invention Example |
| ①-G | grain oriented silicon steel sheet not subjected to chemical polishing treatment or the like | 1.88 | 0.77 | X (peeling) | Comparative Example |
| ②-H | grain oriented silicon steel sheet not subjected to groove-forming treatment | 1.93 | 0.88 | 30 | Comparative Example |

*Diameter (mm) causing no peeling by 180° bending.

As seen from the results of Table 2, in the invention examples of ①-A~①-D, i.e. the cases wherein the silicon steel sheet having a surface smoothened by chemical polishing surface is immersed in the treating solution obtained by diluting the coating solution for tension insulating film consisting essentially of phosphate and colloidal silica with the diluted water and adding a slight amount of the inorganic compound including Fe, Si, Al, B and the like, subjected to an annealing treatment in a non-oxidizing atmosphere to form an extremely thin base film formed by finely dispersing one or more nitride-oxide selected from Fe, Si, Al and B into components for tension insulating film on the surface of the steel sheet and the tension insulating film consisting essentially of phosphate and colloidal silica is formed according to usual manner, there can be obtained ultra-low core loss that the core loss is not more than 0.6 W/kg and an excellent adhesion property that the diameter causing no peeling by 180° bending is not more than 15 mm.

Even in the case ①-F wherein the diluted solution of the coating solution for tension insulating film added with a slight amount of the inorganic compound including Fe, Si, Al, B is applied and the tension insulating film consisting essentially of phosphate and colloidal silica is formed immediately according to usual manner with the omission of the subsequent annealing treatment, there can be obtained excellent core loss property and adhesion property to the film equal to those of the cases ①-A~①-D.

On the contrary, in the case ①-F wherein the diluted solution of the coating solution for tension insulating film not added with a slight amount of the inorganic compound including Fe, Si, Al, B is merely used as the treating solution for the base film, the effect of improving the core loss is observed by the smoothening treatment through the chemical polishing, but the adhesion property is very poor and the peeling is rapidly caused in the bending test, so that it can not be used as the silicon steel sheet.

And also, in the case ①-G wherein the chemical polishing and subsequent formation of the extremely thin base film are not carried out, the improvement of the core loss is carried out only by the fine division of magnetic domain, so that the core loss level of the silicon steel sheet is fairly poor as compared with that of the invention.

In FIG. 3 is shown the film structure of the grain oriented silicon steel sheet according to the invention (FIG. 3(*c*)) in comparison with those of the conventional grain oriented silicon steel sheets (FIGS. 3(*a*), (*b*)).

FIG. 3(*a*) is a case that the tension insulating film consisting essentially of phosphate and colloidal silica is merely formed on the surface of the grain oriented silicon steel sheet after the final annealing as disclosed in JP-A-5-311353. In this case, the adhesion property between the silicon steel sheet and the insulating film comes into a great problem, so that it is difficult to use as a practical product.

And also, FIG. 3(*b*) is a case that an extremely thin ceramic film of TiN, CrN or the like is formed on the surface of the grain oriented silicon steel sheet smoothened by polishing through CVD or PVD and then a tension insulating film is formed thereon as disclosed in JP-B-63-35686. This is very effective to reduce the core loss, but the plasma treatment under high vacuum is required as previously mentioned, so that it is disadvantageous to bring about the cost-up.

On the contrary, in the invention example of FIG. 3(*c*), the extremely thin base film finely dispersed with a slight amount of nitride-oxide of Fe, Si, Al and B is formed on the interface between the grain oriented silicon steel sheet and the tension insulating film, so that the adhesion property to the silicon steel sheet is considerably improved and hence it is considered that the application of tension by the tension insulating film is effectively conducted.

That is, according to the invention, nitride-oxide of Fe, Si, Al and B is finely dispersed into the extremely thin base film to strongly adhere the base film to the matrix of the silicon steel, while since the main components of the base film are the same as the tension insulating film formed thereon, the adhesion property between the base film and the upper tension insulating film is good and hence the tension applying function of the upper tension insulating film can sufficiently be developed by interposing the base film to attain the effect of more improving the core loss.

Therefore, it can be said that the extremely thin base film is good in the adhesion property to the matrix of the silicon steel sheet and the adhesion property to the tension insulating film and is a film possessing an action of a binder between the matrix of the silicon steel sheet and the tension insulating film.

As the extremely thin base film, it is important that such a film contains Fe, Si, Al, B and the like the form of nitride-oxide. For this end, it is important to use a diluted solution obtained by diluting the usual coating solution for tension insulating film with water so as to facilitate the inorganic compound including Fe, Si, Al and B as a starting material to nitride-oxide as the treating solution, and also it is important to make the thickness of the film as thin as possible while satisfying the necessary thickness.

When the coating solution for tension insulating film is diluted as mentioned above, the feature that the inorganic compound of Fe, Si, Al and B included in the diluted solution is easily converted into nitride-oxide by the subsequent heat treatment is shown in Table 3.

Table 3 shows analytical values of Fe, Si, N, O on the surface of the silicon steel sheet prior to the formation of the tension insulating film as measured by X-ray photoelectron microscope spectroscopic apparatus (X-ray Photoelectron Spectroscopy, XPS process). As shown in this table, a great amount of Fe, N, O is observed in the invention example, and particularly a great amount of O is observed in spite of the treatment in the non-oxidizing atmosphere, which shows that Fe easily bonds to oxygen. And also, Si somewhat increases, which is considered due to the fact that colloidal silica in the base film is incorporated.

TABLE 3

| Condition | Treating method (solution consisting essentially of phosphate and colloidal silica) | XPS process (cps) Fe | Si | N | O | Remarks |
|---|---|---|---|---|---|---|
| ①-A | $SiCl_4$: 50 cc | 1600 | 7000 | 800 | 1500 | Invention Example |
| ①-B | $SiCl_4$: 25 cc, $FeCl_3$: 25 g | 3900 | 6500 | 760 | 1550 | Invention Example |
| ①-E | no addition of inorganic compound including Si, Fe, Al, B | 1300 | 5500 | 300 | 890 | Comparative Example |

Further, FIG. 4 shows results of oxide composition in the nitride-oxide as measured by XPS process when the extremely thin base film dispersed with nitride-oxide of Si is formed on the surface of the steel sheet by utilizing $SiCl_4$ as an inorganic compound of Fe, Si, Al, B and the like.

As seen from this figure, the oxide formed by this method is noticed to be mainly composed of $FeSiO_3$ (Clinoferrosilite) and $Fe_2SiO_4$ (Fayalite) (Moreover, the amount of $FeSiO_3$ produced is larger than that of $Fe_2SiO_4$, strictly speaking).

In this case, the above oxide is considered to be formed by the reaction of the following equation:

$$SiCl_4+2H_2O+2FeO \rightarrow Fe_2SiO_4+4HCl$$

And also, the above oxide is very dense different from the conventional $SiO_2$ sub-scale and such a dense oxide produces together with fine nitride, so that it is considered to considerably improve the adhesion property as compared with the conventional one.

EXPERIMENT 4

A continuously cast slab of silicon steel having a composition of C: 0.073 wt %, Si: 3.38 wt %, Mn: 0.070 wt %, Se: 0.020 wt %, Sb: 0.025 wt %, Al: 0.020 wt %, N: 0.0078 wt % and Mo: 0.012 wt % and the remainder being substantially Fe is heated at 1340° C. for 5 hours and hot rolled to obtain a hot rolled sheet of thickness: 2.0 mm. The hot rolled sheet is subjected to normalization annealing at 1000° C. for 3 minutes and rolled twice through an intermediate annealing at 1050° C. to obtain a final cold rolled sheet of thickness: 0.23 mm.

Thereafter, the final cold rolled sheet is treated as follows.

An etching resist ink consisting essentially of an alkyd resin is applied onto the surface of the final cold rolled sheet by gravure offset printing so as to leave linear non-coated portions of width: 200 $\mu$m at an interval: 4 mm in a direction substantially perpendicular to a rolling direction, and baked at 200° C. for 3 minutes. In this case, a resist thickness is 2 $\mu$m. The steel sheet coated with the etching resist is subjected to an electrolytic etching to form linear grooves of width: 200 $\mu$m and depth: 20 $\mu$m and then immersed in an organic solvent to remove the resist. In this case, the electrolytic etching is carried out in NaCl electrolyte under conditions of current density: 10 A/dm$^2$ and treating time: 20 seconds.

Thereafter, the steel sheet is subjected to decarburization and primary recrystallization annealing in wet $H_2$ of 840° C., and a slurry of an annealing separator having a composition of CaO(20%), $Al_2O_3$(60%) and $SiO_2$(20%) is applied to the surface of the steel sheet and annealed at 850° C. for 15 hours and temperature is raised from 850° C. to 1150° C. at a rate of 10° C./h to develop secondary recrystallized grains strongly aligned in Goss orientation and subjected to purification annealing in dry $H_2$ of 1220° C.

The surface film of the thus obtained product is removed and then the surface of the silicon steel sheet is smoothened by chemical polishing and thereafter subjected to a treatment at a step mentioned below.

(A) Step

The silicon steel sheet is immersed in an aqueous solution of $SiCl_4$ solution: 20 cc dissolved in 1500 cc of a distilled water at 80° C. for 1~90 seconds, and further immersed in a treating solution of 80° C. formed by adding $SiCl_4$ solution: 30 cc, $AlPO_4$: 20 g and $H_3PO_3$: 20 g together to a diluted solution formed by diluting a coating solution for tension insulating film consisting essentially of phosphate and colloidal silica: 250 cc with 1500 cc of a distilled water for 1~60 seconds, washed with water and dried.

(B) Step

The silicon steel sheet is immersed in an aqueous solution of $SiCl_4$ solution: 30 cc dissolved in 1500 cc of a distilled water at 80° C. for 1~90 seconds, and further immersed in a treating solution of 80° C. formed by adding $SiCl_4$ solution: 30 cc, $AlPO_4$: 20 g and $H_3PO_3$: 20 g together to a diluted solution formed by diluting a coating solution for tension insulating film consisting essentially of phosphate and colloidal silica: 250 cc with 2000 cc of a distilled water for 1~60 seconds, washed with water and dried.

(C) Step

The silicon steel sheet is immersed in an aqueous solution of $SiCl_4$ solution: 20 cc and $FeCl_3$: 10 g dissolved in 1500 cc of a distilled water at 80° C. for 1~90 seconds, and further immersed in a treating solution of 80° C. formed by adding $SiCl_4$ solution: 25 cc, $FeCl_3$: 15 g, $AlPO_4$: 10 g and $H_3PO_3$: 10 g together to a diluted solution formed by diluting a coating solution for tension insulating film consisting essentially of phosphate and colloidal silica: 250 cc with 1500 cc of a distilled water for 1~90 seconds, washed with water and dried.

Thereafter, the silicon steel sheets treated in the (A)~(C) steps are treated in a mixed gas of $N_2(50\%)+H_2(50\%)$ at 950° C. for 10 minutes, respectively.

Then, a coating solution for tension insulating film consisting essentially of phosphate and colloidal silica is applied onto the surface of the thus obtained steel sheet, dried and baked in $N_2$ gas at 800° C. to form a tension insulating film having a thickness of 2.0 $\mu$m.

A relation between core loss property $W_{17/50}$ (W/kg) of each of the thus obtained products and amount of sheet thickness decreased (both surfaces) before the application of the coating solution for tension insulating film is examined to obtain results as shown in FIG. 5.

As seen from this figure, the effect of reducing the core loss W17/50 (W/kg) of the silicon steel sheet is conspicuous when the decreased amount of sheet thickness is within a range of 0.01~3.0 $\mu$m in all of the (A), (B) and (C) steps.

This reason is considered as follows.

That is, the silicon steel sheet is immersed in an aqueous solution of $SiCl_4$ or a chloride mainly composed of $SiCl_4$ prior to the formation of the base film to promote the surface reaction of the steel sheet to dissolve Fe component on the surface of the steel sheet to a certain extent, whereby the activity and hence the adhesion property of the steel sheet surface are enhanced. Then, fine nitride-oxide of Fe, Si, Al, B and the like in the base film strongly adheres to the activated surface of the steel sheet, and such nitride-oxide serves as an anchor to improve the adhesion property between the silicon steel sheet and the base film and at the same time improve the tension applying effect through the tension insulating film formed thereon, whereby it is considered to obtain the ultra-low core loss.

The state of the interface between the above silicon steel sheet and the base film is considered to create a phenomenon similar to the lateral stripes of about 10 nm observed in the interface of the TiN coated silicon steel sheet of the above item (2) as observed by an electron microscope.

In the invention, it is theoretically impossible to create the thin interface layer approximately equal to TiN formed by plasma treatment under vacuum of PVD, but it is noticed that the ultra-low core loss of the grain oriented silicon steel sheet can be attained by activating the surface of the steel sheet cheaply without using such a vacuum plasma process.

And also, the decrease of the sheet thickness of 0.01~3.0 $\mu$m with the chloride solution in the above silicon steel sheet corresponds to a weight reduction of 0.0005~0.15 g.

Namely, in case of the plasma in the vacuum treatment, it is possible to create a just ideal mixed layer by creating the phenomenon similar to the lateral stripe of about 10 nm observed in the interface of the TiN coated silicon steel sheet of the above item (2) by an electron microscope, but the surface of the steel sheet is activated by creating the weight reduction of 0.0005~0.15 g in the silicon steel sheet without using the vacuum as in the invention, whereby the fine nitride-oxide of Fe, Si, Al, B and the like is preferentially formed in the interface layer to attain the ultra-low core loss.

EXPERIMENT 5

A continuously cast slab of silicon steel having a composition of C: 0.069 wt %, Si: 3.42 wt %, Mn: 0.075 wt %, Se: 0.020 wt %, Sb: 0.025 wt %, Al: 0.020 wt %, N: 0.0073 wt % and Mo: 0.012 wt % and the remainder being substantially Fe is heated at 1360° C. for 5 hours and hot rolled to obtain a hot rolled sheet of thickness: 2.0 mm. The hot rolled sheet is subjected to normalization annealing at 1020° C. for 3 minutes and rolled twice through an intermediate annealing at 1050° C. to obtain a final cold rolled sheet of thickness: 0.23 mm.

Thereafter, the final cold rolled sheet is treated as follows.

An etching resist ink consisting essentially of an alkyd resin is applied onto the surface of the final cold rolled sheet by gravure offset printing so as to leave linear non-coated portions of width: 200 μm at an interval: 4 mm in a direction substantially perpendicular to a rolling direction, and baked at 200° C. for 3 minutes. In this case, a resist thickness is 2 μm. The steel sheet coated with the etching resist is subjected to an electrolytic etching to form linear grooves of width: 200 μm and depth: 20 μm and then immersed in an organic solvent to remove the resist. In this case, the electrolytic etching is carried out in NaCl electrolyte under conditions of current density: 10 $A/dm^2$ and treating time: 20 seconds.

Thereafter, the steel sheet is subjected to decarburization and primary recrystallization annealing in wet $H_2$ of 840° C., and a slurry of an annealing separator having a composition of CaO(20%), $Al_2O_3$(50%) and $SiO_2$(30%) is applied to the surface of the steel sheet and annealed at 850° C. for 15 hours and temperature is raised from 850° C. to 1150° C. at a rate of 12° C./h to develop secondary recrystallized grains strongly aligned in Goss orientation and subjected to purification annealing in dry $H_2$ of 1200° C.

The surface of the thus obtained silicon steel sheet having no forsterite film is treated at a step mentioned below.

(A) Step

The oxide on the surface of the steel sheet is removed by immersing in an aqueous solution (80° C.) of $SiCl_4$: 30 cc in 1500 cc of a distilled water for 1 minute.

(B) Step

The oxide on the surface of the steel sheet is removed by immersing in an aqueous solution (80° C.) of $SiCl_4$: 20 cc and HCl: 20 cc in 1500 cc of a distilled water for 1 minute.

(C) Step

The oxide on the surface of the steel sheet is removed by immersing in an aqueous solution (80° C.) of HCl: 50 cc in 1500 cc of a distilled water for 1 minute.

(D) Step

The oxide on the surface of the steel sheet is removed by immersing in an aqueous solution (80° C.) of HCl: 50 cc in 1500 cc of a distilled water for 0.5 minute and then chemical polishing is carried out in a mixed solution of 3%HF and 97%$H_2O_2$.

(E) Step

After the treatment of the step (D), the same method as in the step (A) is carried out or the steel sheet is immersed in an aqueous solution (80° C.) of $SiCl_4$: 30 cc in 1500 cc of a distilled water for 20 seconds.

Thereafter, the silicon steel sheets treated at the above (A)~(E) steps are treated in a mixed gas of $H_2$(50%)+$N_2$ (50%) at 950° C. for 10 minutes, immersed in a treating solution of 80° C. formed by adding $SiCl_4$ solution: 25 cc, $FeCl_3$: 15 g, $AlPO_4$: 10 g and $H_3PO_3$: 10 g together to a diluted solution obtained by diluting a coating solution for tension insulating film on the surface of the silicon steel sheet consisting essentially of phosphate and colloidal silica: 250 cc in 1500 cc of a distilled water for 20 minutes, washed with water and dried.

Then, the steel sheet is subjected to a heat treatment in a mixed gas of $N_2$(93%)+$H_2$(7%) at 900° C. for 10 minutes.

Moreover, as (A') step, after the treatment of the (A) step, an extremely thin base film is formed on the surface of the steel sheet by merely exposing in N atmosphere for 20 seconds without conducting the heat treatment in the mixed atmosphere of $H_2$(50%)+$N_2$(50%) for a short time and then conducting the same treatment as mentioned above in a mixed gas of $N_2$(93%)+$H_2$(7%).

Thereafter, a coating solution of tension insulating film consisting essentially of phosphate and colloidal silica is applied onto the surface of the steel sheet and dried and baked in $N_2$ gas at 800° C. to form a tension insulating film having a thickness of 2.0 μm.

The core loss property $W_{17/50}$ (W/kg) and adhesion property of the thus obtained products are measured to obtain results as shown in Table 4.

TABLE 4

| Step | Treating method | Magnetic properties $B_8$ (T) | $W_{17/50}$ (W/kg) | Adhesion property (diameter causing no peeling by 180° bending) |
|---|---|---|---|---|
| (A) Invention Example | immersion in aqueous solution containing $SiCl_4$ (30 cc) for 1 minute | 1.91 | 0.63 | 20 mmϕ |
| (A') Invention Example | after step (A), exposure treatment in N-containing non-oxidizing atmosphere | 1.91 | 0.61 | 20 mmϕ |
| (B) Invention | immersion in aqueous solution containing $SiCl_4$ (20 cc) and | 1.91 | 0.65 | 25 mmϕ |

TABLE 4-continued

| Step | Treating method | Magnetic properties $B_8$ (T) | Magnetic properties $W_{17/50}$ (W/kg) | Adhesion property (diameter causing no peeling by 180° bending) |
|---|---|---|---|---|
| Example (C) | HCl (20 cc) for 1 minute immersion in aqueous solution | 1.90 | 0.78 | X |
| Comparative Example (D) | containing HCl (50 cc) for 1 minute immersion in aqueous solution | | | (peeling) |
| Comparative Example | containing HCl (50 cc) for 0.5 minute and chemical polishing in a mixed solution of 3% HF and 97% $H_2O_2$ | 1.91 | 0.70 | X (peeling) |
| (E) Invention Example | immersion in aqueous solution containing HCl (50 cc) for 0.5 minute and chemical polishing in a mixed solution of 3% HF and 97% $H_2O_2$ and further immersion in aqueous solution containing $SiCl_4$ (30 cc) for 20 seconds | 1.91 | 0.56 | 20 mmφ |

As seen from Table 4, in the silicon steel sheets treated at the (A), (A'), (B) and (E) steps according to the invention, it is noticed that ultra-low core loss of 0.56~0.65 W/kg is obtained as the core loss $W_{17/50}$ (W/kg) and the adhesion property is good.

That is, it is noticed that it is possible to produce grain oriented silicon steel sheets having ultra-low core loss and an excellent adhesion property by immersing a grain oriented silicon steel sheet having no forsterite film in an aqueous solution containing $SiCl_4$ and then subjecting to a pickling treatment. Moreover, it is noticed that a particularly better result is obtained by conducting the pickling treatment and the chemical polishing treatment as in the (E) step, but ultra-low core loss of 0.63 W/kg and 0.61 W/kg as $W_{17/50}$ (W/kg) is obtained even at the (A) and (A') steps not conducting the chemical polishing.

Heretofore, there is adopted a method of reducing hysteresis loss of the silicon steel sheet by smoothening the surface of the silicon steel sheet through chemical polishing, electrolytic polishing or the like.

However, the chemical polishing, electrolytic polishing methods have a great problem that the product yield is poor and the polishing cost largely increases.

In the invention, it is noticed that the grain oriented silicon steel sheet having a ultra-low core loss and an excellent adhesion property is obtained very cheaply only by subjecting a surface of a grain oriented silicon steel sheet having no forsterite base film to immersion-pickling treatment in an aqueous solution containing $SiCl_4$.

In FIG. 6 is shown a result of N concentration in a surface portion of a steel sheet as measured by SIMS (Secondary Ion Mass Spectroscopy) when the steel sheet after the final annealing is immersed in $SiCl_4$ solution (80° C.) and exposed in N atmosphere according to the (A') step as compared with the case of chemical polishing in a mixed solution of 3%HF and 97%$H_2O_2$ according to the (D) step.

As shown in this figure, it is noticed that when the steel sheet is immersed in the $SiCl_4$ solution and then exposed in the N atmosphere, a considerably high N-enriched layer is formed on the surface of the steel sheet as compared with the chemically polished material.

As being described based on Experiments 1~5, according to the invention, the interface layer such as nitride-oxide layer of one or more selected from Fe, Si, Al and B or extremely thin base film formed by finely dispersing nitride-oxide of one or more selected from Fe, Si, Al and B into the same film components as in the tension insulating film is formed at the interface between the matrix surface of the silicon steel sheet and the tension insulating film, or further prior to the formation of such an interface layer, the matrix surface is dissolved by immersing in an aqueous solution of a chloride mainly composed of $SiCl_4$ or the smoothening treatment or pickling treatment is carried out by using the aqueous solution containing $SiCl_4$, whereby the adhesion property of the film to the matrix surface can considerably be improved and hence ultra-low core loss grain oriented silicon steel sheets having a considerably excellent core loss property as compared with the conventional material and an excellent magnetostriction property can be obtained very cheaply and in a high productivity.

As silicon-containing steel of a starting material according to the invention, any of conventionally known compositions are adaptable, and typical composition is mentioned as follows.

C: 0.01~0.08 wt %

When C amount is less than 0.01 wt %, the control of hot rolled texture is insufficient and a largely grown grains are formed to degrade the magnetic properties, while when it exceeds 0.08 wt %, a long time is uneconomically taken at decarburization step, so that it is favorable to be about 0.01~0.08 wt %.

Si: 2.0~4.0 wt %

When Si amount is less than 2.0 wt %, sufficient electric resistance is not obtained and hence eddy current loss increases to bring about degradation of core loss, while when it exceeds 4.0 wt %, brittle crack is easily caused in the cold rolling, so that it is favorable to be within a range of about 2.0~4.0 wt %.

Mn: 0.01~0.2 wt %

Mn is an important element determining MnS or MnSe as a dispersion precipitate phase depending the secondary recrystallization of the grain oriented silicon steel sheet. When Mn amount is less than 0.01 wt %, an absolute amount of MnS or the like required for causing the secondary recrystallization is lack and incomplete secondary recrystallization is caused and at the same time surface defect called as blister increases. While, when it exceeds 0.2 wt %, even if dissociation and solid solution of MnS and the like are carried out in the slab heating or the like, the dispersion precipitate phase precipitated in the hot rolling is apt to be coarsened and optimum size distribution desired as an inhibitor is damaged to degrade the magnetic properties. Therefore, Mn is favorable to be about 0.01~0.2 wt %.

S: 0.008~0.1 wt %, Se: 0.003~0.1 wt %

Each of S and Se is favorable to be not more than 0.1 wt %, and preferably S is within a range of 0.008~0.1 wt % and Se is within a range of 0.003~0.1 wt %. When they exceed 0.1 wt %, hot workability and cold workability are degraded, while when each of them is less than lower limit, a considerable effect is not caused in the function of controlling primary grain growth as MnS, MnSe.

Besides, even when Al, Sb, Cu, Sn, B and the like conventionally known as an inhibitor are added together, the effect of the invention is not obstructed.

The production steps of the ultra-low core loss grain oriented silicon steel sheet according to the invention will be described below.

In order to melt the starting material, LD converter, electric furnace, open-hearth furnace and other known steel-making furnaces can be used but also vacuum melting or RH degassing treatment may be used together.

According to the invention, S, Se or other primary grain growth controlling agent included in the starting material can be added to molten steel in a slight amount by anyone of the conventionally known methods. For example, it can be added in molten steel in LD converter, or after the completion of RH degassing or in the ingot making.

And also, in the production of a slab, it is advantageous to adopt a continuous casting method in view of economical and technical merits such as cost reduction, uniformity of component or quality in longitudinal direction of the slab, but the use of conventional ingot making slab is not obstructed.

The continuously cast slab is heated to a temperature of not lower than 1300° C. for dissociation and solid solution of inhibitor in the slab. Thereafter, the slab is subjected to rough hot rolling and subsequently hot finish rolling to obtain a hot rolled sheet having usually a thickness of about 1.3~3.3 mm.

Then, the hot rolled sheet is subjected to cold rolling twice through an intermediate annealing within a temperature range of 850~1100° C., if necessary to a final sheet thickness. In this case, it is required to take a care on final cold rolling ratio (usually 55~90%) for obtaining a product having properties such as high magnetic flux density and low core loss.

From a viewpoint that eddy current loss of the silicon steel sheet is decreased as much as possible, the upper limit of the product thickness is 0.5 mm, while the lower limit of the sheet thickness is 0.05 mm for avoiding deterioration of hysteresis loss.

Particularly, when the linear grooves are formed on the surface of the steel sheet, it is advantageous to conduct this formation to the steel sheet having a product thickness after the final cold rolling.

That is, linear concave regions having width: 50~500 μm and depth: 0.1~50 μm are formed on the surface of the final cold rolled sheet or the steel sheet before and after secondary recrystallization at an interval of 2~10 mm in a direction crossing the rolling direction.

The reason why the interval between the linear concave regions is limited to 2~10 mm is due to the fact that when it is less than 2 mm, the irregularities of the steel sheet become considerably conspicuous and the magnetic flux density uneconomically lowers, while when it exceeds 10 mm, the effect of finely dividing magnetic domain becomes smaller.

When the width of the concave region is less than 50 μm, it is difficult to utilize the anti-magnetic field effect, while when it exceeds 500 μm, the magnetic flux density uneconomically lowers, so that the width of the concave region is limited to a range of 50~500 μm.

When the depth of the concave region is less than 0.1 μm, the anti-magnetic field effect can not effectively be utilized, while when it exceeds 50 μm, the magnetic flux density uneconomically lowers, so that the depth of the concave region is limited to a range of 0.1~50 μm.

Moreover, the forming direction of the linear concave region is optimum to be a direction perpendicular to the rolling direction or the widthwise direction of the sheet. However, substantially the same effect can be obtained when it is within ±30° to the widthwise direction.

As the method of forming the linear concave regions, a method wherein an etching resist is applied onto the surface of the final cold rolled sheet by printing and baked and the etching treatment is conducted and thereafter the resist is removed is advantageous as compared with the conventional method using a knife blade, a laser or the like in a point that it can stably be carried out in industry and a point that the core loss can be reduced more effectively by tensile tension.

A typical example of the technique for the formation of linear grooves through the above etching will be described concretely below.

An etching resist ink mainly composed of alkyd resin is coated onto the surface of the final cold rolled sheet by gravure offset printing so as to leave non-coated portions of width: 200 μm at an interval: 4 mm in a direction substantially perpendicular to the rolling direction, and baked at 200° C. for about 20 seconds. In this case, the resist thickness is about 2 μm. The steel sheet coated with the etching resist is subjected to an electrolytic etching or a chemical etching to form linear grooves having width: 200 μm and depth: 20 μm, and then it is immersed in an organic solvent to remove the resist. In this case, it is favorable that the electrolytic etching conditions are current density: 10 $A/dm^2$ and treating time: about 20 seconds in NaCl electrolyte, and the chemical etching condition is immersion time: about 10 seconds in $HNO_3$ solution.

Then, the steel sheet is subjected to decarburization annealing. This annealing is to render the cold rolled structure into a primary recrystallization structure and at the same time remove harmful C when secondary recrystallized grains of {110} <001> orientation are grown at a final annealing (which may be called as a final annealing), and is carried out, for example, in a wet hydrogen at 750~880° C.

The final annealing is to sufficiently develop the secondary recrystallized grains of {110} <001> orientation, and is usually carried out by raising temperature above 1000° C. immediately in box annealing and holding this temperature. Usually, the final annealing is carried out by applying an annealing separator such as magnesia or the like, wherein a base film called as forsterite is simultaneously formed on the surface.

In the invention, however, even when the forsterite base film is formed, such a base film is removed at subsequent step, so that it is advantageous to use an annealing separator not forming the forsterite base film. That is, it is advantageous to use an annealing separator wherein the content of MgO forming the forsterite base film is decreased (not more than 50%) and the content of CaO, $Al_2O_3$, $CaSiO_3$, $SiO_2$, $PbCl_3$ or the like not forming such a film is increased (not less than 50%).

In the invention, it is advantageous to conduct a temperature-holding annealing at a low temperature of from 820° C. to 900° C. for developing the secondary recrystallized texture highly aligned in {110} <001> orientation, but a slow-heating annealing at a temperature rising rate of, for example, 0.5~15° C./h may be conducted.

After such a purification annealing, the forsterite base film or oxide film on the surface of the surface of the steel sheet is removed by a chemical method such as conventionally known pickling or the like, a mechanical method such as cutting, polishing or the like, or a combination of these methods, whereby the surface of the steel sheet is smoothened.

That is, after the various films are removed from the surface of the steel sheet, the steel sheet surface is smoothened to a center line average roughness Ra of about not more than 0.4 μm by the conventional method being chemical polishing such as chemical polishing, electrolytic polishing or the like, mechanical polishing such as buffing or the like, or a combination thereof.

In the invention, it is not necessarily required to smoothen the surface of the silicon steel sheet. In this case, therefore, there is a merit that the sufficient effect of reducing the core loss can be developed only by the pickling treatment without the smoothening treatment accompanied with the cost-up. However, it is unchanged that the smoothening treatment is advantageous.

At this stage, concaved grooves can be formed on the surface of the steel sheet. The formation of the groove may be conducted by the same method as in the case of forming on the surface of the final cold rolled sheet or the steel sheet before or after the secondary recrystallization.

According to the invention, the above treated steel sheet is subjected to the formation of nitride-oxide layer of one or more selected from Fe, Si, Al and B as an interface layer prior to the formation of a tension insulating film on a matrix surface of the silicon steel sheet.

In this case, an extremely thin Si-containing nitride-oxide layer is optimum as the above nitride-oxide layer.

A preferable method of forming the extremely thin Si-containing nitride-oxide layer is a method wherein a solution containing Si compound, e.g. a diluted aqueous solution containing $SiCl_4$ is applied onto the surface of the steel sheet to adhere a slight amount of Si at an active state and a heat treatment is carried out in a non-oxidizing atmosphere for a short time.

According to this method, a desired film can be obtained very cheaply and for a short time because a long-time treatment at a high cost as in the treatment under vacuum in a high plasma atmosphere is not required.

As the atmosphere in the heat treatment for short time for forming the above nitride-oxide layer, a N-containing non-oxidizing atmosphere is preferable for promoting nitriding, and an atmosphere of a ($N_2$+$H_2$) mixed gas is particularly favorable.

And also, it is favorable that the treating temperature is about 80~1200° C. (preferably about 500~1100° C.) and the treating time is about 1~100 minutes (preferably about 3~30 minutes).

Another preferable method is a method wherein the steel sheet is immersed in a solution containing Si compound to adhere a slight amount of Si at an active state onto the surface and exposed in a N-containing non-oxidizing atmosphere.

Since such an immersion treatment is usually carried out at a bath temperature of about 90° C., even when the exposure in the N-containing non-oxidizing atmosphere is conducted after the immersion, the extremely thin nitride-oxide layer containing Si is formed on the surface of the steel sheet.

The composition of the oxide in the nitride-oxide layer containing Si is mainly composed of $FeSiO_3$ and $Fe_2SiO_4$ as shown in FIG. 4. These oxides are very dense different from the conventional sub-scale of $SiO_2$ and these dense oxides are produced together with fine nitride, so that it is considered to considerably improve the adhesion property as compared with the conventional one.

In the invention, the above heat treatment for short time and exposure treatment in the N-containing non-oxidizing atmosphere are not always required.

Because, even when the heat treatment for short time is not carried out, the Si-containing nitride-oxide layer is preferentially formed on the surface of the steel sheet by a heat treatment in the subsequent formation of an insulating film.

The Si-containing nitride-oxide layer is favorable to be about 0.001~0.1 μm. When the film thickness is less than 0.001 μm, the sufficient adhesion property and hence the effect of reducing the core loss are not obtained, while when it exceeds 0.1 μm, the Si amount becomes too large and it is difficult to satisfactorily form the nitride-oxide layer of Si and hence the improvement of not only the magnetic properties but also the adhesion property to the film are not expected.

In order to obtain the above film thickness, the amount of the solution containing Si compound applied to the steel sheet surface is dependent upon the concentration thereof, but is favorable to be about 0.001~2.0 $g/m^2$. It is more preferably within a range of 0.01~1.0 $g/m^2$.

As the application method, use may be made of any conventionally known methods such as immersion method of immersing the steel sheet itself in a solution, electrolytic treating method and the like in addition to application by means of usual roll coater or the like. The treating temperature may be room temperature, but it is preferable to treat in a warm solution of about 50~100° C. for more effectively conducting the adhesion.

As the Si compound, all of compounds capable of adhering Si at an active state are advantageously adaptable, and the preferable compound is $SiCi_4$.

In the invention, it is required to adhere Si onto the surface of the steel sheet at an active state, so that the previously deactivated oxide or nitride is excluded as the Si compound is used.

In the other embodiment, after Si is thinly formed by PVD or CVD (Si content: about 0.001~0.2 $g/m^2$), it is sufficient to conduct a heat treatment in the non-oxidizing atmosphere for a short time.

Although the rise of the cost is unavoidable, the film thickness can be made extremely thin, so that the cost can be decreased by the thinned thickness as compared with the conventional one.

As the PVD, vapor deposition, ion plating and the like are advantageously adaptable in addition to the above magnetron sputtering method. In this case, the Si film may be crystalline or amorphous. In other words, it is sufficient to be at an active state capable of bonding to N or O.

Thereafter, the coating solution for tension insulating film consisting essentially of a phosphate and colloidal silica is coated onto the surface of the silicon steel sheet according to the usual manner and baked at 500~1000° C. to form a tension insulating film (film thickness: 0.5~5 μm).

As the coating solution for tension insulating film consisting essentially of phosphate and colloidal silica, there are advantageously adapted a coating solution containing colloidal silica: 4~16 wt %, aluminum phosphate: 3~24 wt % and chromic anhydride and/or chromate: 0.2~4.5 wt % as disclosed in JP-B-53-28375, and a coating solution containing colloidal silica: 7~24 wt %, magnesium phosphate: 5~30 wt % (provided that a molar ratio of magnesium phosphate to colloidal silica is 20/80~30/70), and if necessary, chromic anhydride, chromate and/or dichromate: 0.01~5 wt % as disclosed in JP-B-56-52117.

The case that the extremely thin base film is formed as an interface layer by finely dispersing nitride-oxide of one or more selected from Fe, Si, Al and B into the same film components as the tension insulating film prior to the formation of the tension insulating film on the matrix surface of the silicon steel sheet will be described below.

In the formation of such an extremely thin base film, a coating solution for tension insulating film consisting essentially of phosphate and colloidal silica is first diluted with water and a slight amount of an inorganic compound containing one or more selected from Fe, Si, Al and B is added to the diluted solution to form a treating solution.

In the application onto the steel sheet surface, the above treating solution is directly applied onto the surface of the silicon steel sheet, but the treating solution may be applied after an aqueous solution added with the inorganic compound of Fe, Si, Al, B and the like is previously applied onto the steel sheet surface.

In this case, the coating solutions disclosed in JP-B-53-28375 and JP-B-56-52117 as mentioned above are advantageously adapted as the coating solution for tension insulating film consisting essentially of phosphate and colloidal silica.

And also, the coating solution is favorable to be diluted to a diluting degree of about 0.1~60%, preferably 1~20% (for example, amount of diluting about 10~1000 cc of the coating solution into 1500 cc of water).

In the invention, it is necessary to change the inorganic compound of Fe, Si, Al, B and the like included in the underground treating solution into nitride-oxide for forming the base film strongly adhered to the matrix, but when the concentration of the underground treating solution is too thick, it is difficult to well change the inorganic compound into nitride-oxide in the treating atmosphere (preferably mixed gas atmosphere of $N_2$(50%)+$H_2$(50%)) and it is effective to dilute with a proper amount of water for effectively promoting nitriding-oxidation.

Further, the addition amount of the inorganic compound containing one or more selected from Fe, Si, Al and B in the diluted solution is favorable to be about 5~500 g per liter (about 0.001~0.5 mol/l) as the amount of the inorganic compound.

Because, when the amount of the inorganic compound is too small, the effect can not be developed, while when it is too large, the economical merit is not obtained and the film properties are rather degraded.

Among various inorganic compounds, it is particularly advantageous to use $FeCl_3$, $Fe(NO_3)_3$ and the like as Fe-containing inorganic compound, $SiCl_4$, $Na_2SiO_3$, $SiO_2$ and the like as Si-containing inorganic compound, $AlCl_3$, $Al(NO_3)_3$, $AlPO_4$ and the like as Al-containing inorganic compound, and $H_3BO_3$, $Na_2B_4O_7$ and the like as B-containing inorganic compound.

After a slight amount of the inorganic compound of Fe, Si, Al, B and the like is adhered to the matrix surface by applying the treating solution obtained by adding a slight amount of the inorganic compound of Fe, Si, Al, B and the like to the diluted solution of the coating solution for tension insulating film onto the steel sheet surface and drying it as mentioned above, it is subjected to a heat treatment in, preferably, a non-oxidizing atmosphere for a short time, whereby an extremely thin base film finely dispersing nitride-oxide of Fe, Si, Al, B and the like into the tension insulating film components is formed on the surface of the steel sheet.

Moreover, the invention does not necessarily require the heat treatment for short time as mentioned above. Because, even when the heat treatment for short time is not carried out, the extremely thin base film finely dispersed with nitride-oxide of Fe, Si, Al, B and the like as mentioned above is preferentially formed on the steel sheet surface by subsequent heat treatment for the formation of the tension insulating film.

As the application method, use may be made of any conventionally known methods such as immersion method of immersing the steel sheet itself in a solution, method of directly spraying or jetting the treating solution to the steel sheet surface, electrolytic treating method and the like in addition to application by means of usual roll coater or the like. The treating temperature may be room temperature, but it is preferable to treat in a warm solution of about 50~100° C. for more effectively conducting the adhesion. And also, in case of utilizing the immersion method, the immersing time is desirable to be about 1~100 seconds.

In order to form fine nitride-oxide of Fe, Si, Al, B and the like on the surface of the steel sheet after the washing with water and drying, it is more preferably subjected to a heat treatment in a non-oxidizing atmosphere for a short time.

As the treating atmosphere, N-containing non-oxidizing atmosphere is favorable for promoting nitriding, and particularly atmosphere of ($N_2$+$H_2$) mixed gas and ($NH_3$+$H_2$) mixed atmosphere containing ammonia are preferable.

And also, it is favorable that the treating temperature is about 200~1200° C. (preferably about 500~1000° C.) and the treating time is about 1~100 minutes (preferably about 3~30 minutes).

Thus, the extremely thin base film strongly adhered to the surface of the steel sheet can be formed under the presence of nitride-oxide of Fe, Si, Al, B and the like finely dispersed in the film.

Moreover, the application amount of the underground treating solution is favorable to be about 0.001~0.5 g/m$^2$. After the application of such an amount, the heat treatment is carried out, whereby there can finally be obtained the extremely thin base film having a preferable thickness of about 0.001~3.0 $\mu$m.

Thereafter, the coating solution for tension insulating film consisting essentially of colloidal silica and phosphate is coated onto the surface of the above extremely thin base film and baked at a temperature of 500~1000° C. to from a tension insulating film (thickness: 0.5~5 $\mu$m).

In this case, the extremely thin base film is the same material as the tension insulating film formed thereon, so that the adhesion property therebetween is very high and hence the tension insulating film having a considerably excellent adhesion property as compared with the conventional one can be formed on the surface of the steel sheet. Thus, the grain oriented silicon steel sheet having a very low core loss can be obtained in a high productivity and a low cost.

In occasion, it is possible to use an insulating film consisting essentially of a phosphate and chromic acid and containing no colloidal silica in the film as the insulating film.

And also, in order to more develop an inclination function to the silicon steel sheet, it is advantageous that usual insulating film is first formed on the silicon steel sheet and then a tension insulating film is formed thereon.

A pretreatment prior to the formation of the extremely thin base film that the silicon steel sheet is immersed in an aqueous solution of $SiCl_4$ of a chloride mainly composed of $SiCl_4$ to dissolve a surface of a matrix to a certain extent will be described below.

The reason why the above pretreatment is carried out is due to the fact that the activity of the matrix surface and hence the adhesion property are enhanced by dissolving Fe component on the surface of the matrix to a certain extent as previously mentioned.

In this case, the preferable amount of the matrix surface to be dissolved is within a range of about 0.01~3.0 μm as a decreased amount of sheet thickness (about 0.0005~0.15 g as a weight reduction amount) as shown in FIG. 5.

Moreover, the sheet thickness decreased amount is determined by only the pretreatment when the chloride such as $SiCl_4$ or the like is not used as the inorganic compound added to the treating solution in the subsequent formation of the base film. However, when the chloride is used as the inorganic compound, the matrix is somewhat dissolved by the application of the treating solution for the formation of the base film. In the latter case, the sheet thickness decreased amount is evaluated as a value after the treatment for the formation of the base film.

As the chloride other than $SiCl_4$, $MgCl_2$, $CaCl_2$, $SrCl_2$, $BaCl_2$ and the like are advantageously adaptable, but $TiCl_3$, $ZrCl_4$, $NbCl_5$, $TaCl_5$, $CrCl_3$, $CoCl_3$, $NiCl_2$, $CuCl_2$, $ZnCl_2$, $TlCl_3$ or the like may be used in a very slight amount.

Further, the aqueous solution of the chloride may be sprayed or jetted to the surface of the steel sheet instead of the immersion treatment of the silicon steel sheet in the aqueous solution of the chloride.

After the above pretreatment, it is advantageous that the surface of the silicon steel sheet is subjected to so-called exposure treatment exposing in N-containing non-oxidizing atmosphere.

Because, N enriched layer is formed on the surface of the steel sheet by such an exposure treatment (it is considered to form nitride-oxide layer of Si), which advantageously contributes to the improvement of the adhesion property to the film.

And also, an annealing treatment in a non-oxidizing atmosphere above 500° C. may be carried out instead of the above exposure treatment.

Then, an extremely thin film finely dispersing nitride-oxide of one or more selected from Fe, Si, Al and B into the same film components as the tension insulating film consisting essentially of phosphate and colloidal silica is formed as a base film by the method as mentioned above.

As a base of the above extremely thin film, the tension insulating film consisting essentially of phosphate and colloidal silica is not necessarily required, but the usual insulating film consisting essentially of phosphate and chromic acid may be used.

There will be described a case that a pickling treatment or a smoothening treatment is carried out in an aqueous solution containing $SiCl_4$ in case of the pickling treatment or further the smoothening treatment as a surface treatment of the silicon steel sheet after the final annealing.

In this case, the $SiCl_4$ concentration in the aqueous solution used is desirable to be about 0.001~5.0 mol/l. When the concentration is too thick, economical merit is not obtained, while when it is too thin, the treating effect is lessened.

In case of using $SiCl_4$, the incorporation of HCl, $H_3PO_4$, $H_2SO_4$, HF or the like as shown in the (B) step in Table 1, or the use of the other chloride compound, for example, addition of a small amount of $FeCl_3$, $AlCl_3$ or the like is not obstructed.

Further, the aqueous solution containing $SiCl_4$ is effective as an electrolyte, so that the surface of the silicon steel sheet may be subjected to a weak electrolytic treatment. And also, it is possible to directly spray or jet the aqueous solution onto the steel sheet instead of the immersion or electrolytic treatment.

After such a pretreatment, it is advantageous that the surface of the silicon steel sheet is subjected to so-called exposure treatment exposing in N-containing non-oxidizing atmosphere.

Because, N enriched layer is formed on the surface of the steel sheet by such an exposure treatment (it is considered to form nitride-oxide layer of Si), which advantageously contributes to the improvement of the adhesion property to the film.

And also, an annealing treatment in a non-oxidizing atmosphere above 500° C. may be carried out instead of the above exposure treatment.

Then, an extremely thin film finely dispersing nitride-oxide of one or more selected from Fe, Si, Al and B into the same film components as the tension insulating film consisting essentially of phosphate and colloidal silica is formed as a base film by the method as mentioned above.

As a base of the above extremely thin film, the tension insulating film consisting essentially of phosphate and colloidal silica is not necessarily required, but the usual insulating film consisting essentially of phosphate and chromic acid may be used.

BEST MODE FOR CARRYING OUT THE INVENTION

EXAMPLE 1

Figure 1:
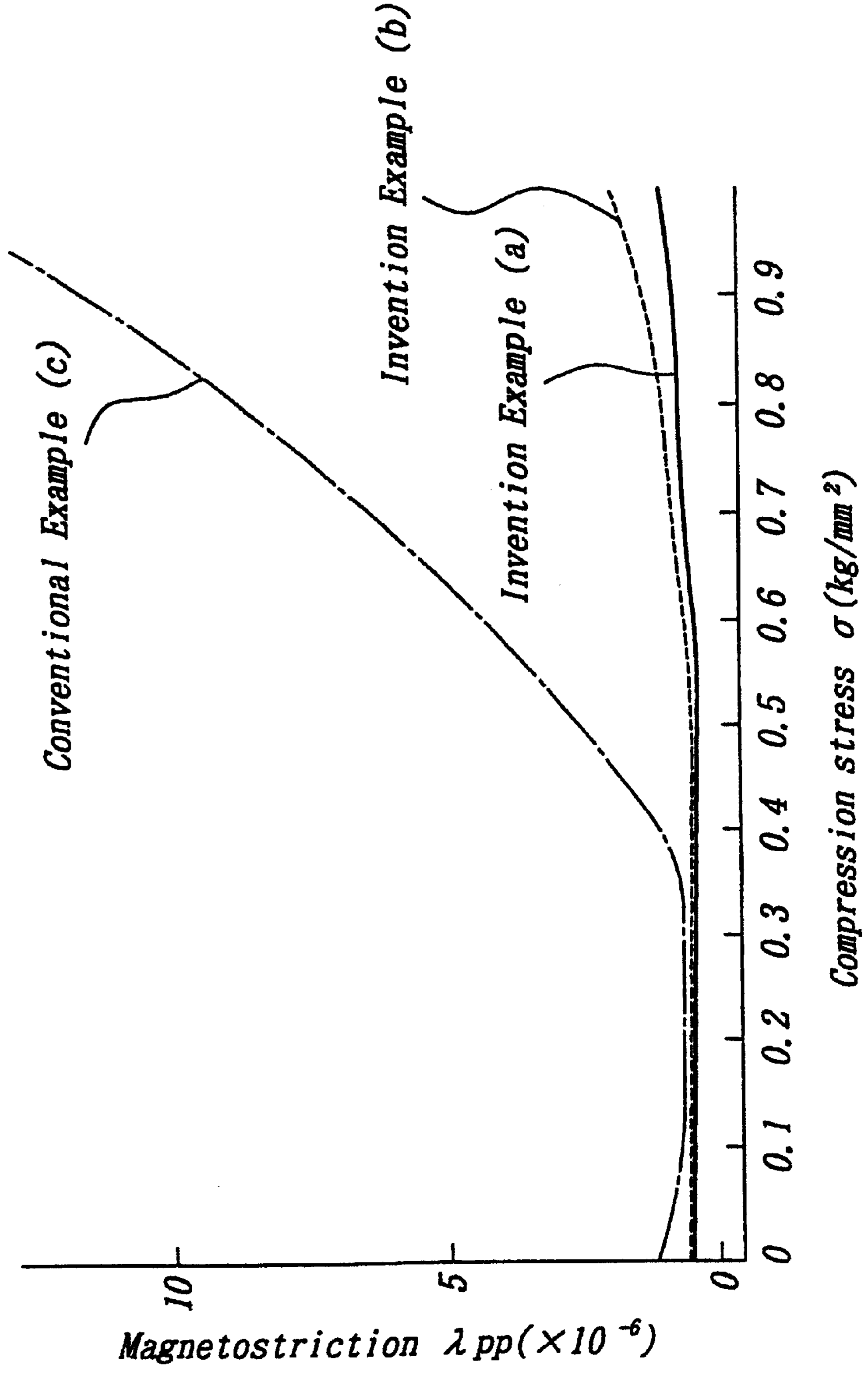
FIG. 1 is a graph showing magnetostriction of silicon steel sheet as a comparison between invention example and conventional example.
Figure 2A:
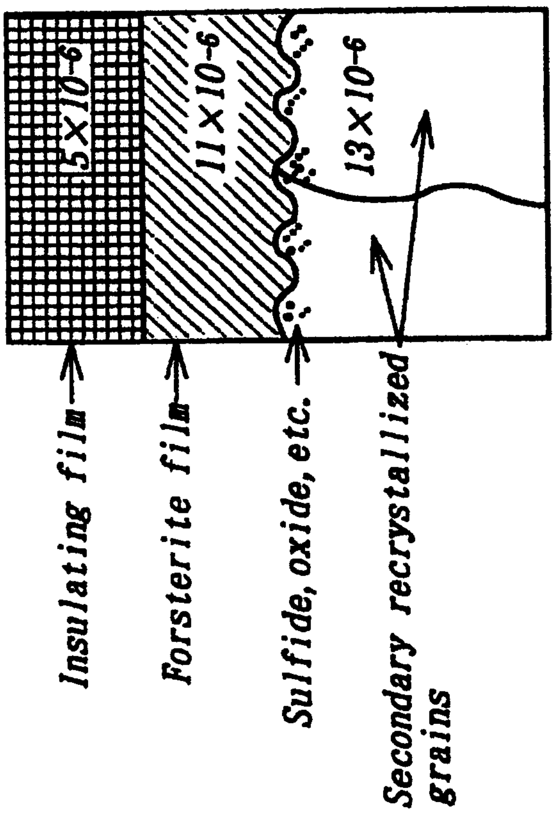
FIG. 2 is a diagrammatic view showing a section near to surface as a comparison between the existing grain oriented silicon steel sheet (FIG. 2*a*) and a grain oriented silicon steel sheet provided with a tension insulating film formed on an extremely thin Si-containing nitride-oxide according to the invention (FIG. 2*b*)
Figure 2B:
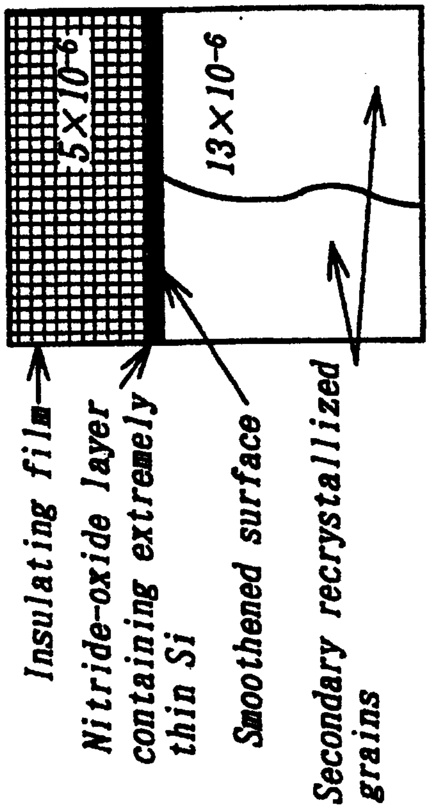
Figure 3A:
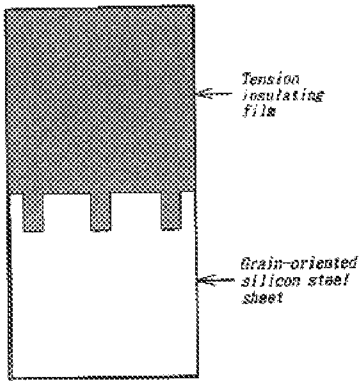
FIG. 3 is a diagrammatic view showing a section near to surface as a comparison among the conventional grain oriented silicon steel sheet obtained by merely forming a tension insulating film consisting essentially of phosphate and colloidal silica on a surface of the grain oriented silicon steel sheet after final annealing (FIG. 3*a*), the conventional grain oriented silicon steel sheet obtained by forming an extremely thin ceramic film of TiN, CrN or the like on a smoothened surface of the grain oriented silicon steel sheet and further forming a tension insulating film thereon (FIG. 3*b*), and a grain oriented silicon steel sheet according to the invention obtained by forming an extremely thin base film finely dispersed with a slight amount of nitride-oxide of Fe, Si, Al, B and the like at an interface between the grain oriented silicon steel sheet and the tension insulating film (FIG. 3*c*)
Figure 3B:
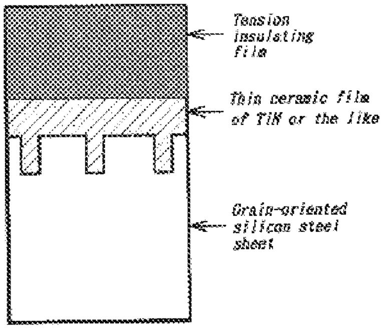
Figure 3C:
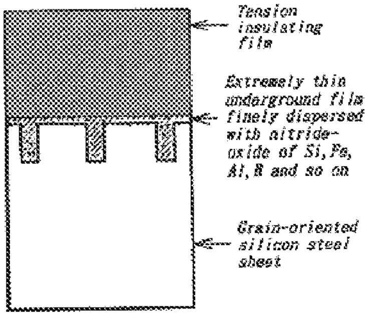
Figure 4:
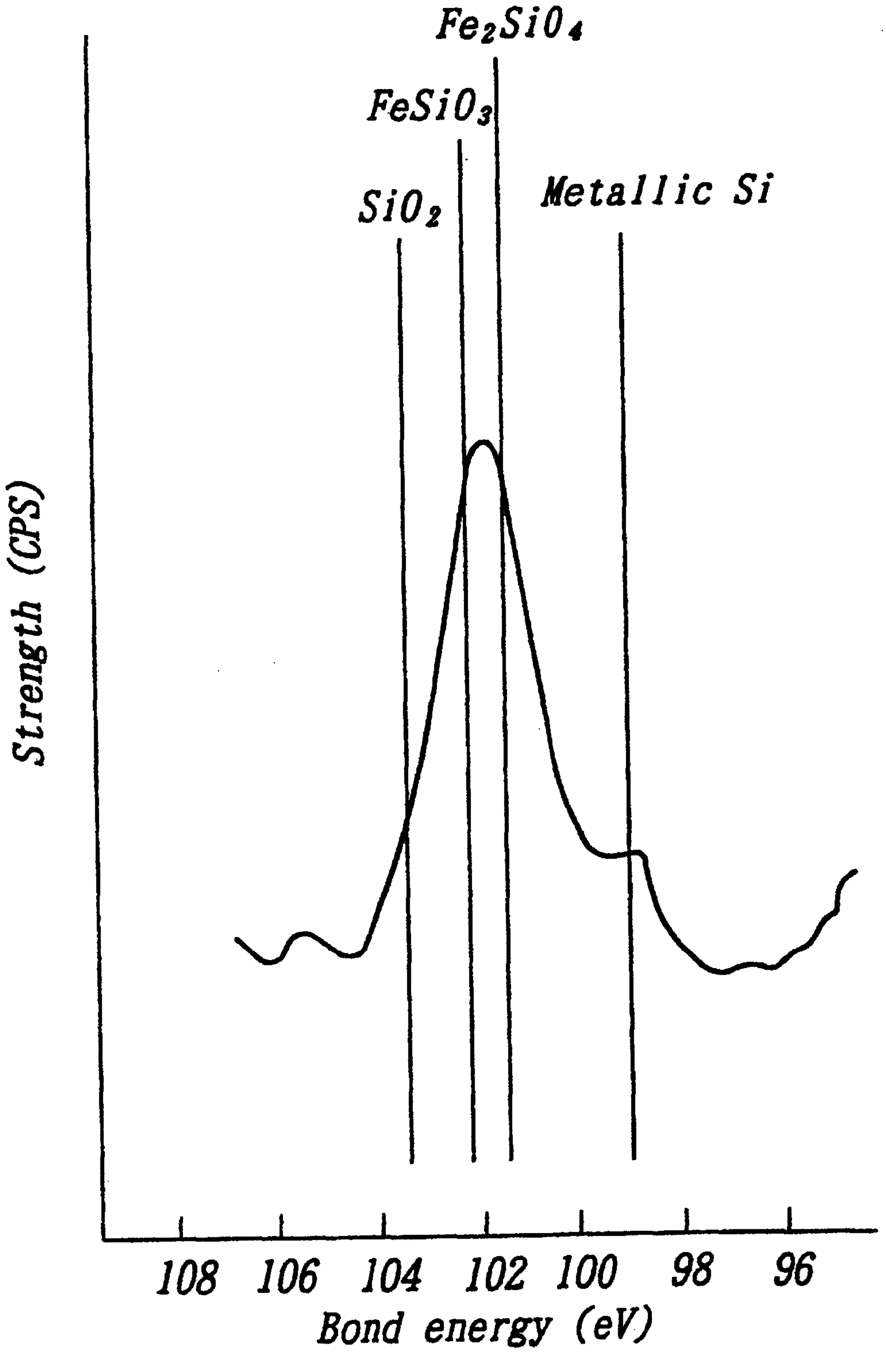
FIG. 4 is a graph showing an oxide composition in nitride-oxide of Si dispersed in the extremely thin base film.
Figure 5:
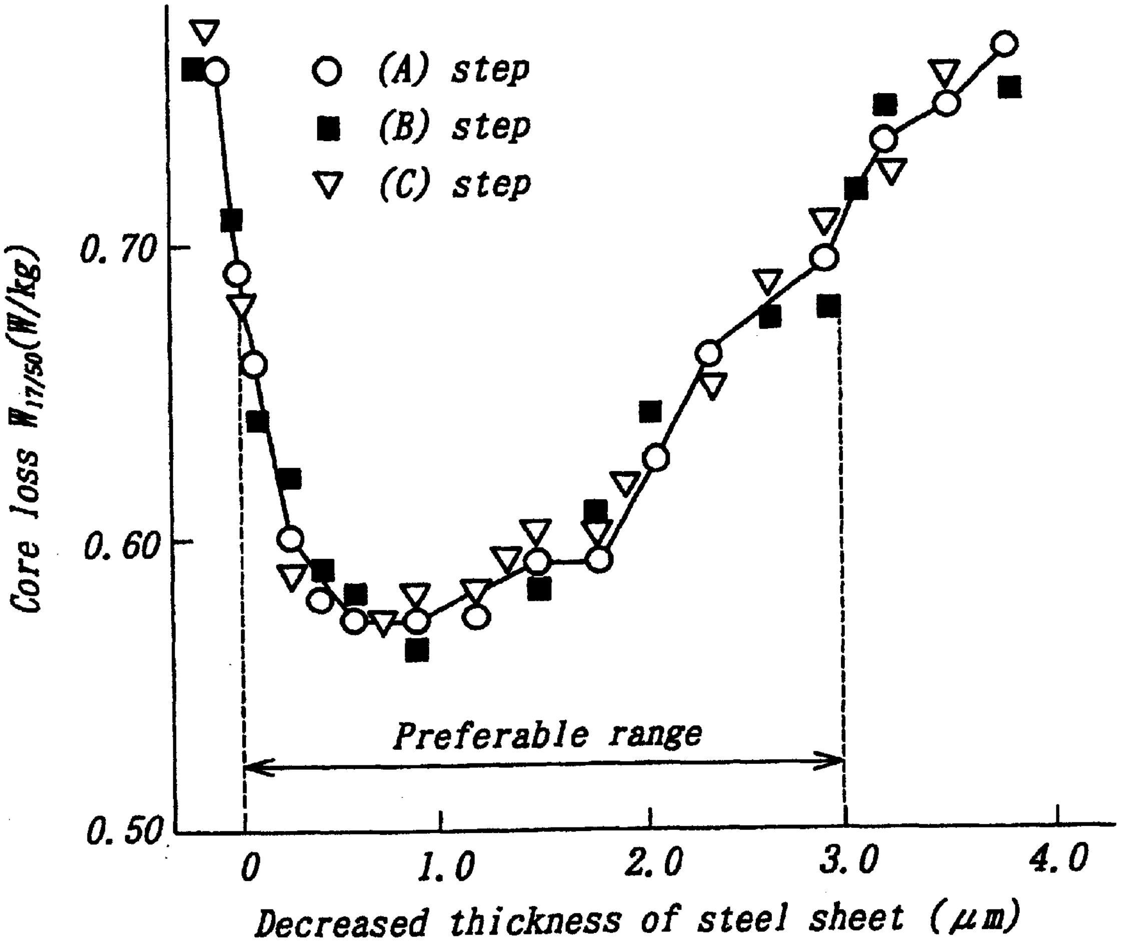
FIG. 5 is a graph showing a relation between decreased amount of sheet thickness prior to the application of a coating solution for tension insulating film and core loss $W_{17/50}$ (W/kg) of a product sheet.
Figure 6:
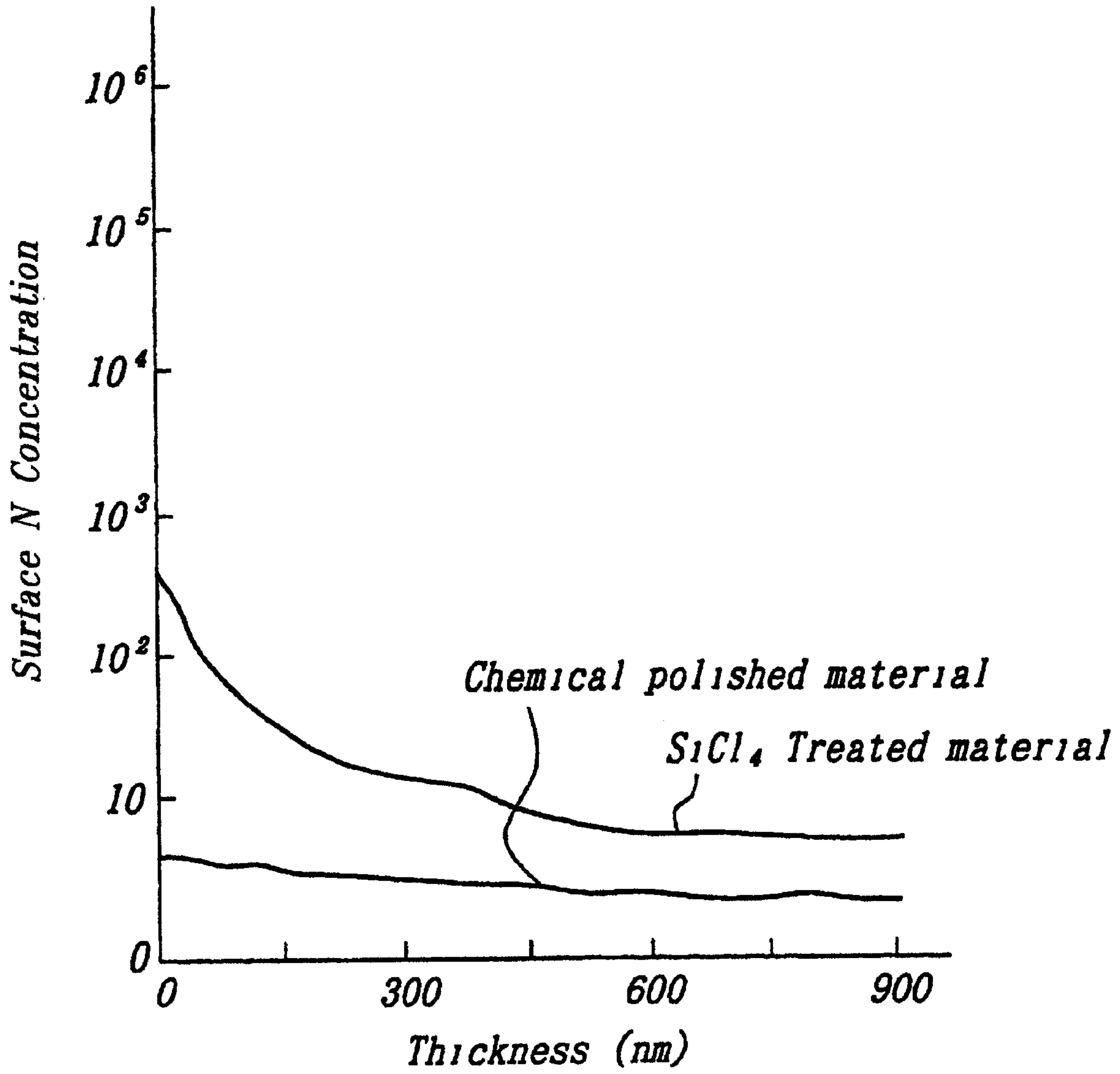
FIG. 6 is a graph showing a comparison of surface N concentration between chemical polished material and SiCl material.

A continuously cast slab of silicon steel having a composition of C: 0.078 wt %, Si: 3.45 wt %, Mn: 0.076 wt %, Se: 0.021 wt %, Sb: 0.025 wt %, Al: 0.024 wt %, N: 0.0073 wt % and Mo: 0.012 wt % and the remainder being substantially Fe is heated at 1350° C. for 4 hours and hot rolled to obtain a hot rolled sheet of thickness: 2.2 mm. Then, the hot rolled sheet is subjected to normalization annealing at 1000° C. and cold rolled twice through an intermediate annealing at 1050° C. to obtain a final cold rolled sheet of thickness: 0.23 mm.

After the decarburization and primary recrystallization annealing in wet $H_2$ of 850° C., a slurry of an annealing separator having a composition of MgO(20%), $Al_2O_3$(70%) and $CaSiO_3$(10%) is applied to the surface of the steel sheet and annealed at 850° C. for 15 hours and temperature is raised from 850° C. to 1180° C. at a rate of 12° C./h to develop secondary recrystallized grains strongly aligned in Goss orientation and subjected to purification annealing in dry $H_2$ of 1220° C.

The thus obtained silicon steel sheet is subjected to either ① a smoothening treatment through chemical polishing or ② a pickling treatment with 10% HCl after the removal of oxide film from the surface.

Then, the silicon steel sheet is immersed in an aqueous solution (80C.) of $SiCl_4$ (0.3 mol/l) for 10 minutes and treated in a mixed gas of $N_2$(50%)+$H_2$(50%) at 950° C. for 10 minutes. Thereafter, a tension insulating film (thickness of about 2 μm) consisting essentially of colloidal silica and phosphate is formed on the surface of the steel sheet and baked at 800° C.

The magnetic properties, adhesion property and compression stress property of magnetostriction in the thus obtained product are as follows.

① In case of the smoothening treatment

| | |
|---|---|
| Magnetic properties | $B_8$: 1.95 T<br>$W_{17/50}$: 0.68 W/kg |
| Adhesion property | good without peeling by 180° bending on a round rod of diameter: 20 mm |
| Magnetostriction | magnetic strain $\lambda_{pp} = 0.8 \times 10^{-6}$ at compression stress $\sigma = 0.4$ kg/mm$^2$, magnetic strain $\lambda_{pp} = 1.1 \times 10^{-6}$ at compression stress $\sigma = 0.6$ kg/mm$^2$ |

② In case of the pickling treatment

| | |
|---|---|
| Magnetic properties | $B_8$: 1.94 T<br>$W_{17/50}$: 0.70 W/kg |
| Adhesion property | good without peeling by 180° bending on a round rod of diameter: 20 mm |
| Magnetostriction | magnetic strain $\lambda_{pp} = 0.7 \times 10^{-6}$ at compression stress $\sigma = 0.4$ kg/mm$^2$, magnetic strain $\lambda_{pp} = 1.2 \times 10^{-6}$ at compression stress $\sigma = 0.6$ kg/mm$^2$ |

For the comparison, after the decarburization and primary recrystallization annealing in wet $H_2$ of 850° C., a slurry of an annealing separator mainly composed of MgO is applied to the surface of the steel sheet and annealed at 850° C. for 15 hours and temperature is raised from 850° C. to 1180° C. at a rate of 10° C./h to develop secondary recrystallized grains strongly aligned in Goss orientation and subjected to purification annealing in dry $H_2$ of 1200° C. Thereafter, a tension insulating film (thickness of about 2 μm) consisting essentially of colloidal silica and phosphate is formed on a forsterite base film and baked at 800° C. The magnetic properties, adhesion property and compression stress property of magnetostriction in the thus obtained grain oriented silicon steel sheet are measured to obtain results as follows.

| | |
|---|---|
| Magnetic properties | $B_8$: 1.95 T<br>$W_{17/50}$: 0.80 W/kg |
| Adhesion property | no peeling by 180° bending on a round rod of diameter: 20 mm |
| Magnetostriction | magnetic strain $\lambda_{pp} = 1.6 \times 10^{-6}$ at compression stress $\sigma = 0.4$ kg/mm$^2$, magnetic strain $\lambda_{pp} = 5.3 \times 10^{-6}$ at compression stress $\sigma = 0.6$ kg/mm$^2$ |

EXAMPLE 2

A continuously cast slab of silicon steel having a composition of C: 0.066 wt %, Si: 3.49 wt %, Mn: 0.072 wt %, Se: 0.020 wt %, Sb: 0.025 wt %, Al: 0.022 wt %, N: 0.0068 wt % and Mo: 0.012 wt % and the remainder being substantially Fe is heated at 1340° C. for 5 hours and hot rolled to obtain a hot rolled sheet of thickness: 2.0 mm. The hot rolled sheet is subjected to normalization annealing at 950° C. and cold rolled twice through an intermediate annealing at 1050° C. to obtain a final cold rolled sheet of thickness: 0.23 mm.

Then, an etching resist ink consisting essentially of an alkyd resin is applied onto the surface of the final cold rolled sheet by gravure offset printing so as to leave linear non-coated portions of width: 200 μm at an interval: 4 mm in a direction substantially perpendicular to a rolling direction, and baked at 200° C. for about 2 seconds. In this case, a resist thickness is 2 μm. The steel sheet coated with the etching resist is subjected to an electrolytic etching to form linear grooves of width: 200 μm and depth: 20 μm and then immersed in an organic solvent to remove the resist. In this case, the electrolytic etching is carried out in NaCl electrolyte under conditions of current density: 10 A/dm$^2$ and treating time: 20 seconds.

After the decarburization and primary recrystallization annealing in wet $H_2$ of 840° C., a slurry of an annealing separator having a composition of MgO(25%), $Al_2O_3$(70%) and $CaSiO_3$(5%) is applied to the surface of the steel sheet and annealed at 850° C. for 15 hours and temperature is raised from 850° C. to 1150° C. at a rate of 10° C./h to develop secondary recrystallized grains strongly aligned in Goss orientation and subjected to purification annealing in dry $H_2$ of 1200° C.

The surface of thus obtained grain oriented silicon steel sheet is smoothened through chemical polishing after the removal of oxide film from the surface of the silicon steel sheet.

Then, the silicon steel sheet is immersed in an aqueous solution (80° C.) of $SiCi_4$ (0.3 mol/l) for 10 seconds and treated in a mixed gas of $N_2$(50%)+$H_2$(50%) at 900C. for 10 minutes. Thereafter, a tension insulating film (thickness of about 2 μm) consisting essentially of colloidal silica and phosphate is formed on the surface of the steel sheet and baked at 800° C.

The magnetic properties and adhesion property in the thus obtained product are as follows.

| | |
|---|---|
| Magnetic properties | $B_8$: 1.91 T<br>$W_{17/50}$: 0.59 W/kg |
| Adhesion property | good without peeling by 180° bending on a round rod of diameter: 20 mm |

And also, an extremely thin Si-containing nitride-oxide layer is formed on the surface of as-pickled steel sheet without chemical polishing and then a tension insulating film of a phosphate is formed thereon. The magnetic properties and adhesion property in the thus obtained product are as follows.

| | |
|---|---|
| Magnetic properties | $B_8$: 1.92 T<br>$W_{17/50}$: 0.64 W/kg |
| Adhesion property | good without peeling by 180° bending on a round rod of diameter: 20 mm |

EXAMPLE 3

A continuously cast slab of silicon steel having a composition of C: 0.044 wt %, Si: 3.39 wt %, Mn: 0.073 wt %, Se: 0.020 wt %, Sb: 0.025 wt % and Mo: 0.012 wt % and the remainder being substantially Fe is heated at 1340° C. for 3 hours and hot rolled to obtain a hot rolled sheet of thickness: 2.4 mm. The hot rolled sheet is subjected to normalization annealing at 900° C. and cold rolled twice through an intermediate annealing at 950° C. to obtain a final cold rolled sheet of thickness: 0.23 mm.

Then, an etching resist ink consisting essentially of an alkyd resin is applied onto the surface of the final cold rolled sheet by gravure offset printing so as to leave linear non-coated portions of width: 200 μm at an interval: 4 mm in a direction substantially perpendicular to a rolling direction, and baked at 200° C. for about 20 seconds. In this case, a resist thickness is 2 μm. The steel sheet coated with the etching resist is subjected to an electrolytic etching to form linear grooves of width: 200 μm and depth: 20 μm and then immersed in an organic solvent to remove the resist. In this case, the electrolytic etching is carried out in NaCl electrolyte under conditions of current density: 10 A/dm$^2$ and treating time: 20 seconds.

After the decarburization and primary recrystallization annealing in wet $H_2$ of 840° C., a slurry of an annealing separator having a composition of MgO(25%), $Al_2O_3$(70%) and $CaSiO_3$(5%) is applied to the surface of the steel sheet and subjected to a temperature-holding annealing at 850° C. for 50 hours to develop secondary recrystallized grains strongly aligned in Goss orientation and subjected to purification annealing in dry $H_2$ of 1200° C.

The surface of thus obtained grain oriented silicon steel sheet is smoothened through chemical polishing after the removal of oxide film from the surface of the silicon steel sheet. Further, Si is formed at a thickness of 0.05 μm by a magnetron sputtering method and treated in a mixed gas of $N_2$(50%)+$H_2$(50%) at 1000° C. for 15 minutes. Thereafter, a tension insulating film (thickness of about 2 μm) consisting essentially of colloidal silica and phosphate is formed on the surface of the steel sheet and baked at 800° C.

The magnetic properties and adhesion property in the thus obtained product are as follows.

| | |
|---|---|
| Magnetic properties | $B_8$ : 1.88 T<br>$W_{17/50}$: 0.66 W/kg |
| Adhesion property | good without peeling by 180° bending on a round rod of diameter: 20 mm |

And also, an extremely thin Si-containing nitride-oxide layer is formed on the surface of as-pickled steel sheet without chemical polishing and then a tension insulating film of a phosphate is formed thereon. The magnetic properties and adhesion property in the thus obtained product are as follows.

| | |
|---|---|
| Magnetic properties | $B_8$: 1.88 T<br>$W_{17/50}$: 0.68 W/kg |
| Adhesion property | good without peeling by 180° bending on a round rod of diameter: 20 mm |

EXAMPLE 4

A continuously cast slab of silicon steel having a composition of C: 0.073 wt %, Si: 3.38 wt %, Mn: 0.078 wt %, Se: 0.020 wt %, Sb: 0.025 wt %, Al: 0.020 wt %, N: 0.0077 wt % and Mo: 0.012 wt % and the remainder being substantially Fe is heated at 1340° C. for 5 hours and hot rolled to obtain a hot rolled sheet of thickness: 2.3 mm. Then, the hot rolled sheet is subjected to normalization annealing at 1000° C. and cold rolled twice through an intermediate annealing at 1050° C. to obtain a final cold rolled sheet of thickness: 0.23 mm.

After the decarburization and primary recrystallization annealing in wet $H_2$ of 840° C., a slurry of an annealing separator having a composition of MgO(20%), $Al_2O_3$(50%), $CaSiO_3$(10%) and $PbCl_2$(20%) is applied to the surface of the steel sheet and annealed at 850° C. for 15 hours and temperature is raised from 850° C. to 1180° C. at a rate of 12° C./h to develop secondary recrystallized grains strongly aligned in Goss orientation and subjected to purification annealing in dry $H_2$ of 1220° C.

The thus obtained silicon steel sheet is subjected to ① a smoothening treatment through chemical polishing or ② a pickling treatment with 10% HCl after the removal of oxide film from the surface.

Then, the silicon steel sheet is immersed in an aqueous solution (85° C.) of $SiCl_4$ (0.2 mol/l) for 0.5 minute and thereafter a treating solution for an insulating coating consisting essentially of a phosphate and chromic acid and further a treating solution for tension insulating coating consisting essentially of colloidal silica and a phosphate are applied and baked at 800° C. to form a two-layer tension insulating film having a total thickness: about 2.0 μm (0.5 μm+1.5 μm).

The magnetic properties and adhesion property in the thus obtained product are as follows.

① In case of the smoothening treatment

| | |
|---|---|
| Magnetic properties | $B_8$: 1.94 T<br>$W_{17/50}$: 0.71 W/kg |
| Adhesion property | good without peeling by 180° bending on a round rod of diameter: 20 mm |

② In case of the pickling treatment

| | |
|---|---|
| Magnetic properties | $B_8$: 1.94 T<br>$W_{17/50}$: 0.73 W/kg |
| Adhesion property | good without peeling by 180° bending on a round rod of diameter: 20 mm |

EXAMPLE 5

A continuously cast slab of silicon steel having a composition of C: 0.076 wt %, Si: 3.41 wt %, Mn: 0.078 wt %, Se: 0.020 wt %, Sb: 0.025 wt %, Al: 0.020 wt %, N: 0.0072 wt % and Mo: 0.012 wt % and the remainder being substantially Fe is heated at 1340° C. for 5 hours and hot rolled to obtain a hot rolled sheet of thickness: 2.0 mm. The hot rolled sheet is subjected to normalization annealing at 950° C. and cold rolled twice through an intermediate annealing at 1050° C. to obtain a final cold rolled sheet of thickness: 0.23 mm.

Then, an etching resist ink consisting essentially of an alkyd resin is applied onto the surface of the final cold rolled sheet by gravure offset printing so as to leave linear non-coated portions of width: 200 μm at an interval: 4 mm in a direction substantially perpendicular to a rolling direction, and baked at 200° C. for about 20 seconds. In this case, a resist thickness is 2 μm. The steel sheet coated with the etching resist is subjected to an electrolytic etching to form linear grooves of width: 200 μm and depth: 20 μm and then immersed in an organic solvent to remove the resist. In this case, the electrolytic etching is carried out in NaCl electrolyte under conditions of current density: 10 A/dm$^2$ and treating time: 20 seconds.

After the decarburization and primary recrystallization annealing in wet $H_2$ of 840° C., a slurry of an annealing separator having a composition of MgO(25%), $Al_2O_3$(70%) and $CaSiO_3$(5%) is applied to the surface of the steel sheet and annealed at 850° C. for 15 hours and temperature is raised from 850° C. to 1150° C. at a rate of 10° C./h to develop secondary recrystallized grains strongly aligned in Goss orientation and subjected to purification annealing in dry $H_2$ of 1200° C.

The surface of thus obtained grain oriented silicon steel sheet is smoothened through chemical polishing after the removal of oxide film from the surface of the silicon steel sheet.

Then, the silicon steel sheet is immersed in an aqueous solution (90° C.) of $SiCl_4$ (0.8 mol/l) for 10 seconds in a vacuum glow box while flowing $N_2$ gas into the box and then subjected to an exposure treatment in a nitrogen atmosphere for 5 seconds. After this method is repeated three times, a tension insulating film (thickness of about 2 μm) consisting essentially of colloidal silica and phosphate is formed on the surface of the steel sheet and baked at 820° C.

The magnetic properties and adhesion property in the thus obtained product are as follows.

| | |
|---|---|
| Magnetic properties | $B_8$: 1.91 T<br>$W_{17/50}$: 0.58 W/kg |
| Adhesion property | good without peeling by 180° bending on a round rod of diameter: 20 mm |

EXAMPLE 6

A continuously cast slab of silicon steel having a composition of C: 0.076 wt %, Si: 3.38 wt %, Mn: 0.069 wt %, Se: 0.020 wt %, Sb: 0.025 wt %, Al: 0.021 wt %, N: 0.0076 wt % and Mo: 0.012 wt % and the remainder being substantially Fe is heated at 1360° C. for 5 hours and hot rolled to obtain a hot rolled sheet of thickness: 2.2 mm. Then, the hot rolled sheet is subjected to normalization annealing at 1000° C. and cold rolled twice through an intermediate annealing at 1050° C. to obtain a final cold rolled sheet of thickness: 0.23 mm.

After the decarburization and primary recrystallization annealing in wet $H_2$ of 850° C., a slurry of an annealing separator having a composition of MgO(20%), $Al_2O_3$(70%) and $CaSiO_3$(10%) is applied to the surface of the steel sheet and annealed at 850° C. for 15 hours and temperature is raised from 850° C. to 1180° C. at a rate of 10° C./h to develop secondary recrystallized grains strongly aligned in Goss orientation and subjected to purification annealing in dry $H_2$ of 1200° C.

The thus obtained silicon steel sheet is subjected to a ① a smoothening treatment through chemical polishing or ② a pickling treatment with 10% HCl after the removal of oxide film from the surface.

Then, the silicon steel sheet is immersed in a treating solution (80° C.) obtained by diluting 250 cc of a coating solution for tension insulating film consisting essentially of magnesium phosphate and colloidal silica with 1500 cc of a distilled water and adding $SiCl_4$: 20 cc, $FeCl_3$: 20 g and $Al(NO_3)_3$: 10 g to the diluted solution for 20 seconds and treated in a mixed gas of $N_2$(50%)+$H_2$(50%) at 950° C. for 7 minutes to form an extremely thin base film having a thickness: 0.2 μm. Thereafter, a tension insulating film (thickness of about 2 μm) consisting essentially of colloidal silica and phosphate is formed on the surface of the steel sheet and baked at 800° C.

The magnetic properties, adhesion property and compression stress property of magnetostriction in the thus obtained product are as follows.

① In case of the smoothening treatment

| | |
|---|---|
| Magnetic properties | $B_8$: 1.94 T<br>$W_{17/50}$: 0.64 W/kg |
| Adhesion property | good without peeling by 180° bending on a round rod of diameter: 25 mm |
| Magnetostriction | magnetic strain $\lambda_{PP}$ = 0.8 × $10^{-6}$ at compression stress $\sigma$ = 0.4 kg/mm$^2$, magnetic strain $\lambda_{PP}$ = 0.9 × $10^{-6}$ at compression stress $\sigma$ = 0.6 kg/mm$^2$ |

② In case of the pickling treatment

| | |
|---|---|
| Magnetic properties | $B_8$: 1.93 T<br>$W_{17/50}$: 0.68 W/kg |
| Adhesion property | good without peeling by 180° bending on a round rod of diameter: 25 mm |
| Magnetostriction | magnetic strain $\lambda_{PP}$ = 0.7 × $10^{-6}$ at compression stress $\sigma$ = 0.4 kg/mm$^2$, magnetic strain $\lambda_{PP}$ = 0.9 × $10^{-6}$ at compression stress $\sigma$ = 0.6 kg/mm$^2$ |

After the above product sheet is subjected to a strain relief annealing at 800° C. for 3 hours, the magnetic properties are measured. As a result, the degradation of the properties is not observed in both cases ① and ② as shown below.

| | |
|---|---|
| ① Magnetic properties | $B_8$: 1.94 T<br>$W_{17/50}$: 0.64 W/kg |
| ② Magnetic properties | $B_8$: 1.93 T<br>$W_{17/50}$: 0.68 W/kg |

For the comparison, after the decarburization and primary recrystallization annealing in wet $H_2$ of 840° C., a slurry of an annealing separator mainly composed of MgO is applied to the surface of the steel sheet and annealed at 850° C. for 15 hours and temperature is raised from 850° C. to 1180° C. at a rate of 10° C./h to develop secondary recrystallized grains strongly aligned in Goss orientation and subjected to purification annealing in dry $H_2$ of 1200° C. Thereafter, a tension insulating film (thickness of about 2 μm) consisting essentially of colloidal silica and phosphate is formed on a forsterite base film and baked at 800° C. The magnetic properties, adhesion property and compression stress property of magnetostriction in the thus obtained grain oriented silicon steel sheet are measured to obtain results as follows.

| | |
|---|---|
| Magnetic properties | $B_8$: 1.94 T<br>$W_{17/50}$: 0.76 W/kg |
| Adhesion property | no peeling by 180° bending on a round rod of diameter: 20 mm |
| Magnetostriction | magnetic strain $\lambda_{PP} = 1.6 \times 10^{-6}$ at compression stress $\sigma = 0.4$ kg/mm$^2$, magnetic strain $\lambda_{PP} = 4.8 \times 10^{-6}$ at compression stress $\sigma = 0.6$ kg/mm$^2$ |

EXAMPLE 7

A continuously cast slab of silicon steel having a composition of C: 0.069 wt %, Si: 3.42 wt %, Mn: 0.073 wt %, Se: 0.020 wt %, Sb: 0.023 wt %, Al: 0.020 wt %, N: 0.0072 wt % and Mo: 0.013 wt % and the remainder being substantially Fe is heated at 1360° C. for 4 hours and hot rolled to obtain a hot rolled sheet of thickness: 2.0mm. The hot rolled sheet is subjected to normalization annealing at 980° C. and cold rolled twice through an intermediate annealing at 1050° C. to obtain a final cold rolled sheet of thickness: 0.23 mm.

Then, an etching resist ink consisting essentially of an alkyd resin is applied onto the surface of the final cold rolled sheet by gravure offset printing so as to leave linear non-coated portions of width: 200 μm at an interval: 4 mm in a direction substantially perpendicular to a rolling direction, and baked at 200° C. for about 20 seconds. In this case, a resist thickness is 2 μm. The steel sheet coated with the etching resist is subjected to an electrolytic etching to form linear grooves of width: 200 μm and depth: 20 μm and then immersed in an organic solvent to remove the resist. In this case, the electrolytic etching is carried out in NaCl electrolyte under conditions of current density: 10 A/dm$^2$ and treating time: 20 seconds.

After the decarburization and primary recrystallization annealing in wet $H_2$ of 850° C., a slurry of an annealing separator having a composition of MgO(20%), $Al_2O_3$(70%) and $CaSiO_3$(10%) is applied to the surface of the steel sheet and annealed at 850° C. for 15 hours and temperature is raised from 850° C. to 1150° C. at a rate of 12° C./h to develop secondary recrystallized grains strongly aligned in Goss orientation and subjected to purification annealing in dry $H_2$ of 1200° C.

The surface of thus obtained grain oriented silicon steel sheet is smoothened through chemical polishing after the removal of oxide film from the surface of the silicon steel sheet.

Then, the silicon steel sheet is immersed in an aqueous solution of $SiCl_4$: 20 cc dissolved in 1500 cc of water at 80° C. for 10 seconds and treated in a mixed gas of $N_2$(50%)+$H_2$(50%) at 950° C. for 3 minutes. Thereafter, it is immersed in a treating solution (80° C.) obtained by diluting 250 cc of a coating solution for tension insulating film consisting essentially of magnesium phosphate and colloidal silica with 1500 cc of a distilled water and adding $SiCl_4$: 20 cc, $AlPO_4$: 15 g and $H_3BO_3$: 19 g to the diluted solution for 20 seconds and treated in a mixed gas of $N_2$(93%)+$H_2$(7%) at 900° C. for 10 minutes to form an extremely thin base film having a thickness: 0.4 μm. Thereafter, a tension insulating film (thickness of about 2 μm) consisting essentially of colloidal silica and phosphate is formed on the surface of the steel sheet and baked at 800° C.

The magnetic properties and adhesion property in the thus obtained product are as follows.

| | |
|---|---|
| Magnetic properties | $B_8$: 1.91 T<br>$W_{17/50}$: 0.57 W/kg |
| Adhesion property | good without peeling by 180° bending on a round rod of diameter: 20 mm |

After the above product sheet is subjected to a strain relief annealing at 800° C. for 3 hours, the magnetic properties are examined to obtain results as follows:

| | |
|---|---|
| Magnetic properties | $B_8$: 1.91 T<br>$W_{17/50}$: 0.57 W/kg |

There is not observed the degradation of the magnetic properties through the strain relief annealing.

And also, the as-pickled steel sheet without chemical polishing is immersed in a treating solution (80° C.) obtained by diluting 250 cc of a coating solution for tension insulating film consisting essentially of magnesium phosphate and colloidal silica with 1500 cc of a distilled water and adding $SiCl_4$: 20 cc, $AlPO_4$: 15 g and $H_3BO_3$: 19 g to the diluted solution for 20 seconds and treated in a mixed gas of $N_2$(93%)+$H_2$(7%) at 900° C. for 10 minutes in the same manner as described above. Thereafter, the tension insulating film is formed thereon. The magnetic properties and adhesion property in the thus obtained product are as follows.

| | |
|---|---|
| Magnetic properties | $B_8$: 1.91 T<br>$W_{17/50}$: 0.65 W/kg |
| Adhesion property | good without peeling by 180° bending on a round rod of diameter: 20 mm |

With respect to this product, the magnetic properties are examined after the strain relief annealing at 800° C. for 3 hours to obtain results as follows:

| | |
|---|---|
| Magnetic properties | $B_8$: 1.91 T<br>$W_{17/50}$: 0.65 W/kg |

There is not observed the degradation of the magnetic properties through the strain relief annealing.

EXAMPLE 8

A continuously cast slab of silicon steel having a composition of C: 0.042 wt %, Si: 3.46 wt %, Mn: 0.070 wt %, Se: 0.021 wt %, Sb: 0.025 wt % and Mo: 0.012 wt % and the remainder being substantially Fe is heated at 1340° C. for 4 hours and hot rolled to obtain a hot rolled sheet of thickness: 2.4 mm. The hot rolled sheet is subjected to normalization annealing at 900° C. and cold rolled twice through an intermediate annealing at 950° C. to obtain a final cold rolled sheet of thickness: 0.23 mm.

Then, an etching resist ink consisting essentially of an alkyd resin is applied onto the surface of the final cold rolled sheet by gravure offset printing so as to leave linear non-coated portions of width: 200 μm at an interval: 4 mm in a direction substantially perpendicular to a rolling direction, and baked at 200° C. for about 20 seconds. In this case, a resist thickness is 2 μm. The steel sheet coated with the etching resist is subjected to an electrolytic etching to form linear grooves of width: 200 μm and depth: 20 μm and then immersed in an organic solvent to remove the resist. In this case, the electrolytic etching is carried out in NaCl electrolyte under conditions of current density: 10 A/dm$^2$ and treating time: 20 seconds.

After the decarburization and primary recrystallization annealing in wet $H_2$ of 840° C., a slurry of an annealing separator having a composition of MgO(25%), $Al_2O_3$(70%) and $CaSiO_3$(5%) is applied to the surface of the steel sheet and subjected to a temperature-holding annealing at 850° C. for 50 hours to develop secondary recrystallized grains strongly aligned in Goss orientation and subjected to purification annealing in dry $H_2$ of 1200° C.

The surface of thus obtained grain oriented silicon steel sheet is smoothened through chemical polishing after the removal of oxide film from the surface of the silicon steel sheet. Further, the silicon steel sheet is immersed in a treating solution (80° C.) obtained by diluting 250 cc of a coating solution for tension insulating film consisting essentially of aluminum phosphate and colloidal silica with 1500 cc of a distilled water and adding $SiCl_4$: 50 cc to the diluted solution for 20 seconds and treated in a mixed gas of $N_2$(50%)+$H_2$(50%) at 950° C. for 10 minutes to form an extremely thin base film having a thickness: 0.6 μm. Thereafter, a tension insulating film (thickness of about 2 μm) consisting essentially of colloidal silica and aluminum phosphate is formed on the surface of the steel sheet and baked at 800° C.

The magnetic properties and adhesion property in the thus obtained product are as follows.

| | |
|---|---|
| Magnetic properties | $B_8$: 1.88 T<br>$W_{17/50}$: 0.63 W/kg |
| Adhesion property | good without peeling by 180° bending on a round rod of diameter: 25 mm |

And also, the extremely thin tension film finely dispersed with an oxide of Si is formed on the surface of the as-pickled steel sheet without chemical polishing in the same manner as described above and thereafter the tension insulating film of aluminum phosphate is formed thereon. The magnetic properties and adhesion property in the thus obtained product are as follows.

| | |
|---|---|
| Magnetic properties | $B_8$: 1.88 T<br>$W_{17/50}$: 0.67 W/kg |
| Adhesion property | good without peeling by 180° bending on a round rod of diameter: 20 mm |

With respect to this product, the magnetic properties are examined after the strain relief annealing at 800° C. for 3 hours to obtain results as follows:

In case of the smoothening treatment

| | |
|---|---|
| Magnetic properties | $B_8$: 1.88 T<br>$W_{17/50}$: 0.63 W/kg |

In case of the pickling treatment

| | |
|---|---|
| Magnetic properties | $B_8$: 1.88 T<br>$W_{17/50}$: 0.67 W/kg |

EXAMPLE 9

A continuously cast slab of silicon steel having a composition of C: 0.073 wt %, Si: 3.40 wt %, Mn: 0.072 wt %, Se: 0.020 wt %, Sb: 0.023 wt %, Al: 0.019 wt %, N: 0.0074 wt % and Mo: 0.013 wt % and the remainder being substantially Fe is heated at 1340° C. for 5 hours and hot rolled to obtain a hot rolled sheet of thickness: 2.0 mm. The hot rolled sheet is subjected to normalization annealing at 1000° C. and cold rolled twice through an intermediate annealing at 1050° C. to obtain a final cold rolled sheet of thickness: 0.23 mm.

Then, an etching resist ink consisting essentially of an alkyd resin is applied onto the surface of the final cold rolled sheet by gravure offset printing so as to leave linear non-coated portions of width: 200 μm at an interval: 4 mm in a direction substantially perpendicular to a rolling direction, and baked at 200° C. for about 20 seconds. In this case, a resist thickness is 2 μm. The steel sheet coated with the etching resist is subjected to an electrolytic etching to form linear grooves of width: 200 μm and depth: 20 μm and then immersed in an organic solvent to remove the resist. In this case, the electrolytic etching is carried out in NaCl electrolyte under conditions of current density: 10 A/dm$^2$ and treating time: 20 seconds.

After the decarburization and primary recrystallization annealing in wet $H_2$ of 840° C., a slurry of an annealing separator having a composition of MgO(20%), $Al_2O_3$(70%) and $CaSiO_3$(10%) is applied to the surface of the steel sheet and annealed at 850° C. for 15 hours and temperature is raised from 850° C. to 1100° C. at a rate of 12° C./h to develop secondary recrystallized grains strongly aligned in Goss orientation and subjected to purification annealing in dry $H_2$ of 1200° C.

The surface of thus obtained grain oriented silicon steel sheet is smoothened through chemical polishing after the removal of oxide film from the surface of the silicon steel sheet.

Then, the silicon steel sheet is immersed in an aqueous solution of $SiCl_4$: 25 cc and $AlNO_3$: 5 g in 1500 cc of water at 90° C. for 40 seconds. Thereafter, it is immersed in a treating solution (80° C.) obtained by diluting 250 cc of a coating solution for tension insulating film consisting essentially of magnesium phosphate and colloidal silica with 1500 cc of a distilled water and adding $SiCi_4$: 20 cc, $AlPO_4$: 15 g and $H_3BO_3$: 10 g to the diluted solution for 20 seconds. Further, a tension insulating film (thickness of about 1.5 μm) consisting essentially of colloidal silica and magnesium phosphate is formed on the surface of the steel sheet and baked at 800° C.

The magnetic properties and adhesion property in the thus obtained product are as follows.

| | |
|---|---|
| Magnetic properties | $B_8$: 1.91 T<br>$W_{17/50}$: 0.59 W/kg |
| Adhesion property | good without peeling by 180° bending on a round rod of diameter: 20 mm |

EXAMPLE 10

A continuously cast slab of silicon steel having a composition of C: 0.078 wt %, Si: 3.36 wt %, Mn: 0.070 wt %, Se: 0.019 wt %, Sb: 0.022 wt %, Al: 0.019 wt %, N: 0.0076 wt % and Mo: 0.012 wt % and the remainder being substantially Fe is heated at 1340° C. for 5 hours and hot rolled to obtain a hot rolled sheet of thickness: 2.2 mm. Then, the hot rolled sheet is subjected to normalization annealing at 950° C. and cold rolled twice through an intermediate annealing at 1000° C. to obtain a final cold rolled sheet of thickness: 0.23 mm.

After the decarburization and primary recrystallization annealing in wet $H_2$ of 840° C., a slurry of an annealing separator having a composition of CaO(20%), $Al_2O_3$(40%) and $SiO_2$(40%) is applied to the surface of the steel sheet and annealed at 850° C. for 15 hours and temperature is raised from 850° C. to 1100° C. at a rate of 10° C./h to develop secondary recrystallized grains strongly aligned in Goss orientation and subjected to purification annealing in dry $H_2$ of 1200° C.

The thus obtained silicon steel sheet is subjected to ① a smoothening treatment through chemical polishing or ② a pickling treatment with 10% HCl after the removal of oxide film from the surface.

Then, the silicon steel sheet is immersed in an aqueous solution of $SiCl_4$ solution: 20 cc and $SiO_2$: 5 g in 1500 cc of a distilled water at 80° C. for 20 seconds and subjected to a heat treatment in a mixed gas of $N_2$(50%)+$H_2$(50%) at 900° C. for 5 minutes.

Thereafter, it is immersed in a treating solution (80° C.) obtained by diluting 250 cc of a coating solution for tension insulating film consisting essentially of magnesium phosphate and colloidal silica with 1500 cc of a distilled water and adding $SiCl_4$: 20 cc, $AlPO_4$: 10 g and $H_3BO_4$: 10 g to the diluted solution for 20 seconds. In this case, the weight reduction is about 0.06 g or the sheet thickness decreased amount is about 1.2 μm. Then, it is subjected to a heat treatment in a mixed gas of $N_2$(93%)+$H_2$(7%) at 900° C. for 5 minutes to form a base film having a thickness: 0.3 μm.

Thereafter, a coating solution for tension insulating film consisting essentially of colloidal silica and magnesium phosphate is coated onto the surface of the steel sheet, dried and baked at 800° C. to form a tension insulating film having a thickness: 2 μm.

The magnetic properties, adhesion property and compression stress property of magnetostriction in the thus obtained product are as follows.

① In case of smoothening treatment

| | |
|---|---|
| Magnetic properties | $B_8$: 1.93 T<br>$W_{17/50}$: 0.64 W/kg |
| Adhesion property | good without peeling by 180° bending on a round rod of diameter: 15 mm |
| Magnetostriction | magnetic strain $\lambda_{pp}$ 0.8 × $10^{-6}$ at compression stress $\sigma$ = 0.4 kg/mm$^2$, magnetic strain $\lambda_{pp}$ = 1.1 × $10^{-6}$ at compression stress $\sigma$ = 0.6 kg/mm$^2$ |

② In case of the pickling treatment

| | |
|---|---|
| Magnetic properties | $B_8$: 1.92 T<br>$W_{17/50}$: 0.67 W/kg |
| Adhesion property | good without peeling by 180° bending on a round rod of diameter: 15 mm |
| Magnetostriction | magnetic strain $\lambda_{pp}$ = 0.9 × $10^{-6}$ at compression stress $\sigma$ = 0.4 kg/mm$^2$, magnetic strain $\lambda_{pp}$ = 1.2 × $10^{-6}$ at compression stress $\sigma$ = 0.6 kg/mm$^2$ |

EXAMPLE 11

A continuously cast slab of silicon steel having a composition of C: 0.072 wt %, Si: 3.36 wt %, Mn: 0.071 wt %, Se: 0.019 wt %, Sb: 0.023 wt %, Al: 0.019 wt %, N: 0.0073 wt % and Mo: 0.013 wt % and the remainder being substantially Fe is heated at 1360° C. for 5 hours and hot rolled to obtain a hot rolled sheet of thickness: 2.0 mm. The hot rolled sheet is subjected to normalization annealing at 1000° C. and cold rolled twice through an intermediate annealing at 1000° C. to obtain a final cold rolled sheet of thickness: 0.23 mm.

Then, an etching resist ink consisting essentially of an alkyd resin is applied onto the surface of the final cold rolled sheet by gravure offset printing so as to leave linear non-coated portions of width: 200 μm at an interval: 4 mm in a direction substantially perpendicular to a rolling direction, and baked at 200° C. for about 20 seconds. In this case, a resist thickness is 2 μm. The steel sheet coated with the etching resist is subjected to an electrolytic etching to form linear grooves of width: 200 μm and depth: 20 μm and then immersed in an organic solvent to remove the resist. In this case, the electrolytic etching is carried out in NaCl electrolyte under conditions of current density: 10 A/dm$^2$ and treating time: 20 seconds.

After the decarburization and primary recrystallization annealing in wet $H_2$ of 850° C., a slurry of an annealing separator having a composition of MgO(5%), CaO(25%), $Al_2O_3$(30%), $CaSiO_3$(10%) and $SiO_2$(30%) is applied to the surface of the steel sheet and annealed at 850° C. for 15 hours and temperature is raised from 850° C. to 1050° C. at a rate of 12° C./h to develop secondary recrystallized grains strongly aligned in Goss orientation and subjected to purification annealing in dry $H_2$ of 1200° C.

The surface of thus obtained grain oriented silicon steel sheet is smoothened through chemical polishing after the removal of oxide film from the surface of the silicon steel sheet.

Then, the silicon steel sheet is immersed in an aqueous solution of $SiCl_4$: 15 cc and $FeCl_3$: 10 g in 1500 cc of a distilled water at 85° C. for 10 seconds and treated in a mixed gas of $N_2$(50%)+$H_2$(50%) at 950° C.

Thereafter, it is immersed in a treating solution (80° C.) obtained by diluting 250 cc of a coating solution for tension insulating film consisting essentially of magnesium phosphate and colloidal silica with 1500 cc of a distilled water and adding $SiCl_4$: 25 cc, $AlCl_3$: 5 g and $H_3BO_4$: 10 g to the diluted solution for 20 seconds. In this case, the weight reduction is about 0.04 g or the sheet thickness decreased amount is about 0.8 μm. Then, it is subjected to a heat treatment in a mixed gas of $N_2$(93%)+$H_2$(7%) at 900° C. for 10 minutes to form a base film having a thickness: 0.2 μm.

Thereafter, a coating solution for tension insulating film consisting essentially of colloidal silica and magnesium phosphate is coated onto the surface of the steel sheet, dried and baked at 800° C. to form a tension insulating film having a thickness: about 1.5 μm.

The magnetic properties and adhesion property in the thus obtained product are as follows.

| | |
|---|---|
| Magnetic properties | $B_8$: 1.90 T<br>$W_{17/50}$: 0.58 W/kg |
| Adhesion property | good without peeling by 180° bending on a round rod of diameter: 10 mm |

And also, the pretreatment, treatment for the formation of base film and treatment for the formation of tension insulating film are carried out on the surface of the as-pickled steel sheet without chemical polishing under the same conditions as mentioned above. The magnetic properties and adhesion property in the thus obtained product are as follows.

| | |
|---|---|
| Magnetic properties | $B_8$: 1.90 T<br>$W_{17/50}$: 0.64 W/kg |
| Adhesion property | good without peeling by 180° bending on a round rod of diameter: 10 mm |

EXAMPLE 12

A continuously cast slab of silicon steel having a composition of C: 0.042 wt %, Si: 3.36 wt %, Mn: 0.068 wt %, Se: 0.022 wt %, Sb: 0.025 wt % and Mo: 0.012 wt % and the remainder being substantially Fe is heated at 1330° C. for 4 hours and hot rolled to obtain a hot rolled sheet of thickness: 2.4 mm. The hot rolled sheet is subjected to normalization annealing at 950° C. and cold rolled twice through an intermediate annealing at 980° C. to obtain a final cold rolled sheet of thickness: 0.23 mm.

Then, an etching resist ink consisting essentially of an alkyd resin is applied onto the surface of the final cold rolled sheet by gravure offset printing so as to leave linear non-coated portions of width: 200 μm at an interval: 4 mm in a direction substantially perpendicular to a rolling direction, and baked at 200° C. for about 20 seconds. In this case, a resist thickness is 2 μm. The steel sheet coated with the etching resist is subjected to an electrolytic etching to form linear grooves of width: 200 μm and depth: 20 μm and then immersed in an organic solvent to remove the resist. In this case, the electrolytic etching is carried out in NaCl electrolyte under conditions of current density: 10 A/dm$^2$ and treating time: 20 seconds.

After the decarburization and primary recrystallization annealing in wet $H_2$ of 840° C., a slurry of an annealing separator having a composition of MgO(5%), $Al_2O_3$(50%), $CaSiO_3$(5%) and $SiO_2$(40%) is applied to the surface of the steel sheet and subjected to temperature-holding annealing at 850° C. for 50 hours to develop secondary recrystallized grains strongly aligned in Goss orientation and subjected to purification annealing in dry $H_2$ of 1200° C.

The surface of thus obtained grain oriented silicon steel sheet is smoothened through chemical polishing after the removal of oxide film from the surface of the silicon steel sheet.

Then, the silicon steel sheet is immersed in an aqueous solution of $SiCl_4$: 15 cc dissolved in 1500 cc of a distilled water at 90° C. for 15 seconds and treated in a mixed gas of $N_2$(50%)+$H_2$(50%) at 900° C.

Thereafter, it is immersed in a treating solution (80° C.) obtained by diluting 100 cc of a coating solution for tension insulating film consisting essentially of aluminum phosphate and colloidal silica with 1500 cc of a distilled water and adding $SiCl_4$: 15 cc, $AlCl_3$: 5 g and $H_3BO_3$: 5 g to the diluted solution for 15 seconds. In this case, the weight reduction is about 0.08 g or the sheet thickness decreased amount is about 1.6 μm. Then, it is treated in a mixed gas of $N_2$(93%)+$H_2$(7%) at 880° C. for 3 minutes to form a base film having a thickness: 0.4 μm.

Thereafter, a coating solution for tension insulating film consisting essentially of colloidal silica and phosphate is coated onto the surface of the steel sheet, dried and baked at 800° C. to form a tension insulating film having a thickness: about 2.5 μm.

The magnetic properties and adhesion property in the thus obtained product are as follows.

| | |
|---|---|
| Magnetic properties | $B_8$: 1.88 T<br>$W_{17/50}$: 0.63 W/kg |
| Adhesion property | good without peeling by 180° bending on a round rod of diameter: 15 mm |

After the above product sheet is subjected to a strain relief annealing at 800° C. for 3 hours, the magnetic properties are examined to obtain results as follows:

| | |
|---|---|
| Magnetic properties | $B_8$: 1.88 T<br>$W_{17/50}$: 0.61 W/kg |

There is not observed the degradation of the magnetic properties through the strain relief annealing.

And also, the pretreatment, treatment for the formation of base film and treatment for the formation of tension insulating film are carried out on the surface of the as-pickled steel sheet without chemical polishing under the same conditions as mentioned above. The magnetic properties and adhesion property in the thus obtained product are as follows.

| | |
|---|---|
| Magnetic properties | $B_8$: 1.88 T<br>$W_{17/50}$: 0.67 W/kg |
| Adhesion property | good without peeling by 180° bending on a round rod of diameter: 10 mm |

EXAMPLE 13

A continuously cast slab of silicon steel having a composition of C: 0.074 wt %, Si: 3.31 wt %, Mn: 0.076 wt %, Se: 0.020 wt %, Sb: 0.023 wt %, Al: 0.020 wt %, N: 0.0071 wt % and Mo: 0.012 wt % and the remainder being substantially Fe. is heated at 1340° C. for 5 hours and hot rolled to obtain a hot rolled sheet of thickness: 2.0 mm. The hot rolled sheet is subjected to normalization annealing at 1000° C. and cold rolled twice through an intermediate annealing at 1000° C. to obtain a final cold rolled sheet of thickness: 0.23 mm.

Then, an etching resist ink consisting essentially of an alkyd resin is applied onto the surface of the final cold rolled sheet by gravure offset printing so as to leave linear non-coated portions of width: 200 μm at an interval: 4 mm in a direction substantially perpendicular to a rolling direction, and baked at 200° C. for about 20 seconds. In this case, a resist thickness is 2 μm. The steel sheet coated with the etching resist is subjected to an electrolytic etching to form linear grooves of width: 200 μm and depth: 20 μm and then immersed in an organic solvent to remove the resist. In this case, the electrolytic etching is carried out in NaCl electrolyte under conditions of current density: 10 $A/dm^2$ and treating time: 20 seconds.

After the decarburization and primary recrystallization annealing in wet $H_2$ of 850° C., a slurry of an annealing separator having a composition of MgO(5%), CaO(25%), $Al_2O_3$(30%), $CaSiO_3$(10%), $SiO_2$(30%) and $PbCl_2$(20%) is applied to the surface of the steel sheet and annealed at 850° C. for 15 hours and temperature is raised from 850° C. to 1050° C. at a rate of 12° C./h to develop secondary recrystallized grains strongly aligned in Goss orientation and subjected to purification annealing in dry $H_2$ of 1200° C.

The surface of thus obtained grain oriented silicon steel sheet is smoothened through chemical polishing after the removal of oxide film from the surface of the silicon steel sheet.

Then, the silicon steel sheet is immersed in an aqueous solution of $SiCl_4$: 15 cc and $FeCl_3$: 5 g dissolved in 1500 cc of a distilled water at 85° C. for 10 seconds.

Thereafter, it is immersed in a treating solution (80° C.) obtained by diluting 250 cc of a coating solution for tension insulating film consisting essentially of magnesium phosphate and colloidal silica with 1500 cc of a distilled water and adding $SiCl_4$: 15 cc, $AlCl_3$: 5 g and $H_3BO_4$: 5 g to the diluted solution for 20 seconds. In this case, the weight reduction is about 0.02 g or the sheet thickness decreased amount is about 0.4 μm.

Then, a coating solution for insulating film consisting essentially of magnesium phosphate and chromic acid is applied at a thickness of 0.5 μm and further a coating solution for tension insulating film consisting essentially of colloidal silica and magnesium phosphate is coated thereon, dried and baked at 800° C. to form a tension insulating film having a thickness: about 1.0 μm.

The magnetic properties and adhesion property in the thus obtained product are as follows.

| | |
|---|---|
| Magnetic properties | $B_8$: 1.91 T<br>$W_{17/50}$: 0.63 W/kg |
| Adhesion property | good without peeling by 180° bending on a round rod of diameter: 10 mm |

And also, the pretreatment, treatment for the formation of base film and treatment for the formation of tension insulating film are carried out on the surface of the as-pickled steel sheet without chemical polishing under the same conditions as mentioned above. The magnetic properties and adhesion property in the thus obtained product are as follows.

| | |
|---|---|
| Magnetic properties | $B_8$: 1.91 T<br>$W_{17/50}$: 0.67 W/kg |
| Adhesion property | good without peeling by 180° bending on a round rod of diameter: 10 mm |

EXAMPLE 14

A continuously cast slab of silicon steel having a composition of C: 0.076 wt %, Si: 3.41 wt %, Mn: 0.078 wt %, Se: 0.019 wt %, Sb: 0.025 wt %, Al: 0.020 wt %, N: 0.0076 wt % and Mo: 0.012 wt % and the remainder being substantially Fe is heated at 1350° C. for 4 hours and hot rolled to obtain a hot rolled sheet of thickness: 2.0 mm. The hot rolled sheet is subjected to normalization annealing at 1000° C. and cold rolled twice through an intermediate annealing at 1020° C. to obtain a final cold rolled sheet of thickness: 0.23 mm.

Then, an etching resist ink consisting essentially of an alkyd resin is applied onto the surface of the final cold rolled sheet by gravure offset printing so as to leave linear non-coated portions of width: 200 μm at an interval: 4 mm in a direction substantially perpendicular to a rolling direction, and baked at 200° C. for about 20 seconds. In this case, a resist thickness is 2 μm. The steel sheet coated with the etching resist is subjected to an electrolytic etching to form linear grooves of width: 200 μm and depth: 20 μm and then immersed in an organic solvent to remove the resist. In this case, the electrolytic etching is carried out in NaCl electrolyte under conditions of current density: 10 $A/dm^2$ and treating time: 20 seconds.

After the decarburization and primary recrystallization annealing in wet $H_2$ of 840° C., a slurry of an annealing separator having a composition of MgO(5%), CaO(25%), $Al_2O_3$(30%), $CaSiO_3$(10%) and $SiO_2$(30%) is applied to the surface of the steel sheet and annealed at 850° C. for 15 hours and temperature is raised from 850° C. to 1050° C. at a rate of 12° C./h to develop secondary recrystallized grains strongly aligned in Goss orientation and subjected to purification annealing in dry $H_2$ of 1200° C.

The surface of thus obtained grain oriented silicon steel sheet is smoothened through chemical polishing after the removal of oxide film from the surface of the silicon steel sheet.

Then, the silicon steel sheet is treated in a vacuum glow box in $N_2$ gas atmosphere. That is, the silicon steel sheet is immersed in an aqueous solution of $SiCl_4$: 25 cc and $AlNO_3$: 5 g dissolved in 1500 cc of a distilled water at 90° C. for 10 seconds and then exposed in $N_2$ gas atmosphere for 5 seconds. This treatment is repeated three times.

Thereafter, it is immersed in a treating solution (80° C.) obtained by diluting 250 cc of a coating solution for tension insulating film consisting essentially of magnesium phosphate and colloidal silica with 1500 cc of a distilled water and adding $SiCl_4$: 25 cc, $AlCl_3$: 5 g and $H_3BO_4$: 10 g to the diluted solution for 20 seconds. In this case, the weight reduction is about 0.04 g or the sheet thickness decreased amount is about 0.8 μm. Then, a coating solution for tension insulating film consisting essentially of colloidal silica and magnesium phosphate is coated on the surface of the steel sheet, dried and baked at 800° C. to form a tension insulating film having a thickness: about 1.5 μm.

The magnetic properties and adhesion property in the thus obtained product are as follows.

| | |
|---|---|
| Magnetic properties | $B_8$: 1.90 T<br>$W_{17/50}$: 0.57 W/kg |
| Adhesion property | good without peeling by 180° bending on a round rod of diameter: 20 mm |

EXAMPLE 15

A continuously cast slab of silicon steel having a composition of C: 0.075 wt %, Si: 3.47 wt %, Mn: 0.068 wt %, Se: 0.020 wt %, Sb: 0.025 wt %, Al: 0.020 wt %, N: 0.0073 wt % and Mo: 0.012 wt % and the remainder being substantially Fe is heated at 1350° C. for 5 hours and hot rolled to obtain a hot rolled sheet of thickness: 2.2 mm. The hot rolled sheet is subjected to normalization annealing at 1000° C. and cold rolled twice through an intermediate annealing at 1050° C. to obtain a final cold rolled sheet of thickness: 0.23 mm.

After the decarburization and primary recrystallization annealing in wet $H_2$ of 840° C., a slurry of an annealing separator having a composition of CaO(10%), $Al_2O_3$(50%) and $SiO_2$(40%) is applied to the surface of the steel sheet and annealed at 850° C. for 15 hours and temperature is raised from 850° C. to 1100° C. at a rate of 12° C./h to develop secondary recrystallized grains strongly aligned in Goss orientation and subjected to purification annealing in dry $H_2$ of 1200° C.

The thus obtained silicon steel sheet having no forsterite base film is subjected to a pickling treatment in an aqueous solution of $SiCl_4$: 50 cc dissolved in 1500 cc of a distilled water at 80° C. for 60 seconds to remove the oxide from the surface and treated in a mixed gas of $N_2$(50%)+$H_2$(50%) at 950° C. for 5 minutes.

Thereafter, it is immersed in a treating solution (80° C.) obtained by diluting 250 cc of a coating solution for tension insulating film consisting essentially of magnesium phosphate and colloidal silica with 1500 cc of a distilled water and adding $SiCl_4$: 20 cc, $AlPO_4$: 10 g and $H_3BO_4$: 10 g to the diluted solution for 20 seconds and treated in a mixed gas of $N_2$(93%)+$H_2$(7%) at 950° C. for 5 minutes to form abase film having a thickness: 0.3 μm.

Thereafter, a coating solution for tension insulating film consisting essentially of colloidal silica and magnesium phosphate is coated on the surface of the steel sheet, dried and baked at 800° C. to form a tension insulating film having a thickness: about 2 μm.

The magnetic properties, adhesion property and magnetostriction property in the thus obtained product are as follows.

| | |
|---|---|
| Magnetic properties | $B_8$: 1.94 T<br>$W_{17/50}$: 0.62 W/kg |
| Adhesion property | good without peeling by 180° bending on a round rod of diameter: 20 mm |
| Magnetostriction | magnetic strain $\lambda_{pp} = 0.7 \times 10^{-6}$ at compression stress $\sigma = 0.4$ kg/mm$^2$, magnetic strain $\lambda_{pp} = 1.2 \times 10^{-6}$ at compression stress $\sigma = 0.6$ kg/mm$^2$ |

EXAMPLE 16

A continuously cast slab of silicon steel having a composition of C: 0.077 wt %, Si: 3.46 wt %, Mn: 0.070 wt %, Se: 0.019 wt %, Sb: 0.025 wt %, Al: 0.020 wt %, N: 0.0074 wt % and Mo: 0.013 wt % and the remainder being substantially Fe is heated at 1350° C. for 5 hours and hot rolled to obtain a hot rolled sheet of thickness: 2.0 mm. The hot rolled sheet is subjected to normalization annealing at 1000° C. and cold rolled twice through an intermediate annealing at 1030° C. to obtain a final cold rolled sheet of thickness: 0.23 mm.

Then, an etching resist ink consisting essentially of an alkyd resin is applied onto the surface of the final cold rolled sheet by gravure offset printing so as to leave linear non-coated portions of width: 200 μm at an interval: 4 mm in a direction substantially perpendicular to a rolling direction, and baked at 200° C. for about 20 seconds. In this case, a resist thickness is 2 μm. The steel sheet coated with the etching resist is subjected to an electrolytic etching to form linear grooves of width: 200 μm and depth: 20 μm and then immersed in an organic solvent to remove the resist. In this case, the electrolytic etching is carried out in NaCl electrolyte under conditions of current density: 10 A/dm$^2$ and treating time: 20 seconds.

After the decarburization and primary recrystallization annealing in wet $H_2$ of 850° C., a slurry of an annealing separator having a composition of MgO(5%), CaO(25%), $Al_2O_3$(30%), $CaSiO_3$(10%) and $SiO_2$(30%) is applied to the surface of the steel sheet and annealed at 850° C. for 15 hours and temperature is raised from 850° C. to 1050° C. at a rate of 12° C./h to develop secondary recrystallized grains strongly aligned in Goss orientation and subjected to purification annealing in dry $H_2$ of 1220° C.

The surface of the thus obtained silicon steel sheet having no forsterite film is treated under the following two conditions.

① It is immersed in an aqueous solution of $SiCl_4$: 45 cc and $FeCl_3$: 10 g dissolved in 1500 cc of a distilled water at 85° C. for 60 seconds.

② After the treatment of the item ①, the surface of the steel sheet is further subjected to chemical polishing with a mixed solution of (3%HF+97%$H_2O_2$).

Then, each of the steel sheets is immersed in an aqueous solution of $SiCl_4$: 20 cc dissolved in 1500 cc of a distilled water at 80° C. for 20 seconds and subjected to a heat treatment in a mixed gas of $N_2$(50%)+$H_2$(50%) at 950° C.

Thereafter, a coating solution for tension insulating film consisting essentially of colloidal silica and magnesium phosphate is coated on the surface of the steel sheet, dried and baked at 800° C. to form a tension insulating film having a thickness: about 1.5 μm.

The magnetic properties and adhesion property in the thus obtained product are as follows. Silicon steel sheet treated under the condition ①

| | |
|---|---|
| Magnetic properties | $B_8$: 1.91 T<br>$W_{17/50}$: 0.62 W/kg |
| Adhesion property | good without peeling by 180° bending on a round rod of diameter: 20 mm |

Silicon steel sheet treated under the condition ①

| | |
|---|---|
| Magnetic properties | $B_8$: 1.91 T<br>$W_{17/50}$: 0.57 W/kg |
| Adhesion property | good without peeling by 180° bending on a round rod of diameter: 20 mm |

EXAMPLE 17

A continuously cast slab of silicon steel having a composition of C: 0.044 wt %, Si: 3.37 wt %, Mn: 0.069 wt %, Se: 0.021 wt %, Sb: 0.024 wt % and Mo: 0.012 wt % and the remainder being substantially Fe is heated at 1320° C. for 4 hours and hot rolled to obtain a hot rolled sheet of thickness: 2.4 mm. The hot rolled sheet is subjected to normalization annealing at 950° C. and cold rolled twice through an intermediate annealing at 1000° C. to obtain a final cold rolled sheet of thickness: 0.23 mm.

Then, an etching resist ink consisting essentially of an alkyd resin is applied onto the surface of the final cold rolled sheet by gravure offset printing so as to leave linear non-coated portions of width: 200 μm at an interval: 4 mm in a direction substantially perpendicular to a rolling direction, and baked at 200° C. for about 20 seconds. In this case, a resist thickness is 2 μm. The steel sheet coated with the etching resist is subjected to an electrolytic etching to form linear grooves of width: 200 μm and depth: 20 μm and then immersed in an organic solvent to remove the resist. In this case, the electrolytic etching is carried out in NaCl electrolyte under conditions of current density: 10 $A/dm^2$ and treating time: 20 seconds.

After the decarburization and primary recrystallization annealing in wet $H_2$ of 840° C., a slurry of an annealing separator having a composition of MgO(5%), $Al_2O_3$(50%), $CaSiO_3$(15%) and $SiO_2$(30%) is applied to the surface of the steel sheet and subjected to temperature-holding annealing at 850° C. for 50 hours to develop secondary recrystallized grains strongly aligned in Goss orientation and subjected to purification annealing in dry $H_2$ of 1220° C.

The thus obtained silicon steel sheet having no forsterite film is immersed in an aqueous solution of $SiCl_4$: 55 cc dissolved in 1500 cc of a distilled water at 85° C. for 60 seconds. Thereafter, the silicon steel sheet is further immersed in an aqueous solution of $SiCl_4$: 15 cc dissolved in 1500 cc of a distilled water at 90° C. for 15 seconds and treated in a mixed gas of $N_2$(50%)+$H_2$(50%) at 900° C.

Thereafter, it is immersed in a treating solution (80° C.) obtained by diluting 200 cc of a coating solution for tension insulating film consisting essentially of aluminum phosphate and colloidal silica with 2000 cc of a distilled water and adding $SiCl_4$: 20 cc to the diluted solution for 40 seconds and subjected to a heat treatment in a mixed gas of $N_2$(93%)+$H_2$(7%) at 950° C. for 3 minutes to form a base film having a thickness: 0.4 μm.

Thereafter, a coating solution for tension insulating film consisting essentially of colloidal silica and aluminum phosphate is coated on the surface of the steel sheet, dried and baked at 800° C. to form a tension insulating film having a thickness: about 2.5 μm.

The magnetic properties and adhesion property in the thus obtained product are as follows.

| | |
|---|---|
| Magnetic properties | $B_8$: 1.88 T<br>$W_{17/50}$: 0.65 W/kg |
| Adhesion property | good without peeling by 180° bending on a round rod of diameter: 20 mm |

After the above product is subjected to a strain relief annealing at 800° C. for 3 hours, the magnetic properties are examined to obtain results as follows:

| | |
|---|---|
| Magnetic properties | $B_8$: 1.88 T<br>$W_{17/50}$: 0.64 W/kg |

EXAMPLE 18

A continuously cast slab of silicon steel having a composition of C: 0.073 wt %, Si: 3.42 wt %, Mn: 0.076 wt %, Se: 0.020 wt %, Sb: 0.025 wt %, Al: 0.020 wt %, N: 0.0074 wt % and Mo: 0.012 wt % and the remainder being substantially Fe is heated at 1340° C. for 5 hours and hot rolled to obtain a hot rolled sheet of thickness: 2.0 mm. The hot rolled sheet is subjected to normalization annealing at 1000° C. and cold rolled twice through an intermediate annealing at 1030° C. to obtain a final cold rolled sheet of thickness: 0.23 mm.

Then, an etching resist ink consisting essentially of an alkyd resin is applied onto the surface of the final cold rolled sheet by gravure offset printing so as to leave linear non-coated portions of width: 200 μm at an interval: 4 mm in a direction substantially perpendicular to a rolling direction, and baked at 200° C. for about 20 seconds. In this case, a resist thickness is 2 μm. The steel sheet coated with the etching resist is subjected to an electrolytic etching to form linear grooves of width: 200 μm and depth: 20 μm and then immersed in an organic solvent to remove the resist. In this case, the electrolytic etching is carried out in NaCl electrolyte under conditions of current density: 10 $A/dm^2$ and treating time: 20 seconds.

After the decarburization and primary recrystallization annealing in wet $H_2$ of 850° C., a slurry of an annealing separator having a composition of MgO(5%), CaO(25%), $Al_2O_3$(30%), $CaSiO_3$(10%), $SiO_2$(20%) and $PbCl_2$(20%) is applied to the surface of the steel sheet and annealed at 850° C. for 15 hours and temperature is raised from 850° C. to 1050° C. at a rate of 12° C./h to develop secondary recrystallized grains strongly aligned in Goss orientation and subjected to purification annealing in dry $H_2$ of 1220° C.

The surface of the thus obtained silicon steel sheet having no forsterite film is treated under the following two conditions.

① It is immersed in an aqueous solution of HCl: 25 cc, $H_3PO_4$: 25 cc and $SiCl_4$: 45 cc dissolved in 1500 cc of a distilled water at 85° C. for 60 seconds.

② After the treatment of the item ①, the surface of the steel sheet is further subjected to chemical polishing with a mixed solution of (3%HF+97%$H_2O_2$).

Then, each of the steel sheets is immersed in an aqueous solution of $SiCl_4$: 20 cc dissolved in 1500 cc of a distilled water at 80° C. for 20 seconds.

Thereafter, it is immersed in a treating solution (80° C.) obtained by adding $SiCl_4$: 25 cc, $AlCl_3$: 5 g and $H_3BO_4$: 10 g to a diluted solution obtained by dissolving 250 cc of a coating solution for tension insulating film consisting essentially of magnesium phosphate and colloidal silica in 1500 cc of a distilled water for 20 seconds to from a base film having a thickness: 0.3 μm.

Thereafter, a coating solution for insulating film consisting essentially of magnesium phosphate and chromic acid is applied onto the surface of the steel sheet at a thickness of 0.5 μm and then a coating solution for tension insulating film consisting essentially of colloidal silica and magnesium phosphate is coated thereon, dried and baked at 800° C. to form a tension insulating film having a thickness: about 1.0 μm.

The magnetic properties and adhesion property in the thus obtained product are as follows.

Silicon steel sheet treated under the condition ①

| | |
|---|---|
| Magnetic properties | $B_8$: 1.91 T<br>$W_{17/50}$: 0.65 W/kg |
| Adhesion property | good without peeling by 180° bending on a round rod of diameter: 20 mm |

Silicon steel sheet treated under the condition ②

| | |
|---|---|
| Magnetic properties | $B_8$: 1.91 T<br>$W_{17/50}$: 0.62 W/kg |
| Adhesion property | good without peeling by 180° bending on a round rod of diameter: 20 mm |

EXAMPLE 19

A continuously cast slab of silicon steel having a composition of C: 0.076 wt %, Si: 3.32 wt %, Mn: 0.071 wt %, Se: 0.020 wt %, Sb: 0.025 wt %, Al: 0.020 wt %, N: 0.0068 wt % and Mo: 0.012 wt % and the remainder being substantially Fe is heated at 1350° C. for 4 hours and hot rolled to obtain a hot rolled sheet of thickness: 2.0 mm. The hot rolled sheet is subjected to normalization annealing at 1000° C. and cold rolled twice through an intermediate annealing at 1050° C. to obtain a final cold rolled sheet of thickness: 0.23 mm.

Then, an etching resist ink consisting essentially of an alkyd resin is applied onto the surface of the final cold rolled sheet by gravure offset printing so as to leave linear non-coated portions of width: 200 μm at an interval: 4 mm in a direction substantially perpendicular to a rolling direction, and baked at 200° C. for about 20 seconds. In this case, a resist thickness is 2 μm. The steel sheet coated with the etching resist is subjected to an electrolytic etching to form linear grooves of width: 200 μm and depth: 20 μm and then immersed in an organic solvent to remove the resist. In this case, the electrolytic etching is carried out in NaCl electrolyte under conditions of current density: 10 $A/dm^2$ and treating time: 20 seconds.

After the decarburization and primary recrystallization annealing in wet $H_2$ of 840° C., a slurry of an annealing separator having a composition of MgO(5%), CaO(25%), $Al_2O_3$(30%), $CaSiO_3$(10%), $SiO_2$(20%) and $PbCl_2$(10%) is applied to the surface of the steel sheet and annealed at 850° C. for 15 hours and temperature is raised from 850° C. to 1080° C. at a rate of 12° C./h to develop secondary recrystallized grains strongly aligned in Goss orientation and subjected to purification annealing in dry $H_2$ of 1220° C.

The thus obtained silicon steel sheet is immersed in an aqueous solution of HCl: 30 cc, $H_3PO_4$: 25 cc and $SiCl_4$: 25 cc dissolved in 1500 cc of a distilled water at 85° C. for 60 seconds. Thereafter, the surface of the steel sheet is further subjected to chemical polishing in a mixed solution of (3%HF+97%$H_2O_2$).

Then, the silicon steel sheet is treated in a vacuum glow box in $N_2$ atmosphere as follows.

That is, the silicon steel sheet is immersed in an aqueous solution of $SiCl_4$: 20 cc dissolved in 1500 cc of a distilled water at 90° C. for 10 seconds and then exposed in $N_2$ atmosphere for 5 seconds. This treatment is repeated three times.

Thereafter, it is immersed in a treating solution (80° C.) obtained by diluting 250 cc of a coating solution for tension insulating film consisting essentially of magnesium phosphate and colloidal silica with 1500 cc of a distilled water and adding $SiCl_4$: 25 cc, $AlCl_3$: 5 g and $H_3BO_4$: 10 g to the diluted solution for 20 seconds to form a base film having a thickness: 0.3 μm.

Thereafter, a coating solution for insulating film consisting essentially of magnesium phosphate and chromic acid is applied onto the surface of the steel sheet at a thickness of 0.5 μm and then a coating solution for tension insulating film consisting essentially of colloidal silica and magnesium phosphate is coated thereon, dried and baked at 800° C. to form a tension insulating film having a thickness: about 1.0 μm.

The magnetic properties and adhesion property in the thus obtained product are as follows.

| | |
|---|---|
| Magnetic properties | $B_8$: 1.91 T<br>$W_{17/50}$: 0.62 W/kg |
| Adhesion property | good without peeling by 180° bending on a round rod of diameter: 20 mm |

INDUSTRIAL APPLICABILITY

According to the invention, the interface layer including nitride-oxide of one or more selected from Fe, Si, Al and B is formed at the interface between the matrix surface and the tension insulating film in the silicon steel sheet, whereby the core loss can considerably be reduced and also the compression stress property of magnetostriction can effectively be improved and further the improvement of production efficiency and the decrease of cost can be attained.

What is claimed is:

1. An ultra-low core loss grain oriented silicon steel sheet having a matrix surface and having on said matrix surface a tension insulating film consisting essentially of a phosphate and colloidal silica, said sheet having a thickness of 0.05~0.5 mm after final annealing, and said sheet having an interface layer comprising one or more nitride-oxides selected from the group consisting of Fe, Si, Al and B positioned between said matrix surface of the steel sheet and said tension insulating film.

2. An ultra-low core loss grain oriented silicon steel sheet according to claim 1, wherein said interface layer is a Si-containing nitride-oxide layer having a thickness of about 0.00–3.0 μm.

3. An ultra-low core loss grain oriented silicon steel sheet according to claim 1, wherein said interface layer is a base film comprising one or more nitride-oxides selected from the group consisting of Fe, Si, Al and B said group being combined with the same film components as said tension insulating film.

4. An ultra-low core loss grain oriented silicon steel sheet according to claim 1 wherein said matrix surface of said steel sheet is provided with linear concave regions having a width of 50~500 μm and a depth of 0.1~50 μm at an interval of 2~10 mm in a direction to a transverse rolling direction of said sheet.

5. An ultra-low core loss grain oriented silicon steel sheet according to any of claims 1–4 wherein the surface of the grain oriented silicon steel sheet after final annealing is further subjected to a smoothening treatment.

6. An ultra-low core loss grain oriented silicon steel sheet according to any of claims 1–4, wherein the surface of the grain oriented silicon steel sheet is subjected to pickling but is not subjected to a smoothening treatment.

7. An ultra-low core loss grain oriented silicon steel sheet according to claim 1, wherein the interface layer is an extremely thin Si-containing nitride-oxide layer, wherein the matrix surface of the steel sheet is provided with linear concave regions having a width: 50~500 μm and a depth: 0.1~50 μm at an interval of 2~10 mm in a direction crossing its rolling direction.

8. An ultra-low core loss grain oriented silicon steel sheet according to claim 1, wherein the interface layer is an extremely thin base film formed by finely dispersing nitride-oxide of one or more selected from Fe, Si, Al and B into the same film components as the tension insulating film, wherein the matrix surface of the steel sheet is provided with linear concave regions having a width: 50~500 μm and a depth: 0.1~50 μm at an interval of 2~10 mm in a direction crossing its rolling direction.

9. An ultra-low core loss grain oriented silicon steel sheet having a rolling direction, having a matrix surface and having on said matrix surface a tension insulating film consisting essentially of a phosphate and colloidal silica and having a thickness of 0.05~0.5 mm after final annealing, wherein an interface layer comprising one or more nitride-oxides selected from the group consisting of Fe, Si, Al, and B positioned between said matrix surface of the steel sheet and said tension insulating film, wherein said matrix surface of the steel sheet is provided with linear concave regions having a width: 50~500 μm and a depth: 0.1~50 μm at an interval of 2~10 mm in a direction crossing its rolling directions.

* * * * *

UNITED STATES PATENT AND TRADEMARK OFFICE
CERTIFICATE OF CORRECTION

PATENT NO. : 6,287,703 B1 
DATED : September 11, 2001
INVENTOR(S) : Inokuti

It is certified that error appears in the above-identified patent and that said Letters Patent is hereby corrected as shown below:

Column 50,
Line 49, please change “0.00-3.0$\mu$m” to -- 0.001-3.0--$\mu$m --.

Signed and Sealed this

Thirty-first Day of December, 2002

JAMES E. ROGAN
*Director of the United States Patent and Trademark Office*